(12) United States Patent
Lin et al.

(10) Patent No.: US 12,537,942 B2
(45) Date of Patent: *Jan. 27, 2026

(54) METHOD AND APPARATUS OF ENCODING OR DECODING USING REFERENCE SAMPLES DETERMINED BY PREDEFINED CRITERIA

(71) Applicant: HFI Innovation Inc., Zhubei (TW)

(72) Inventors: Zhi-Yi Lin, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/799,494

(22) Filed: Aug. 9, 2024

(65) Prior Publication Data

US 2024/0406382 A1 Dec. 5, 2024

Related U.S. Application Data

(63) Continuation of application No. 17/503,595, filed on Oct. 18, 2021, now abandoned, which is a
(Continued)

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS 10,038,920 B2 7/2018 Helle
2011/0255591 A1* 10/2011 Kim ................. H04N 19/61
375/E7.243
(Continued)

FOREIGN PATENT DOCUMENTS

WO 2011/126348 A2 10/2011
WO 2012/175003 A1 12/2012
(Continued)

OTHER PUBLICATIONS

International Search Report and Written Opinion dated Dec. 30, 2019, issued in application No. PCT/CN2019/110160.
(Continued)

*Primary Examiner* — Zhihan Zhou
(74) *Attorney, Agent, or Firm* — McClure, Qualey & Rodack, LLP

(57) ABSTRACT

A video processing method comprises receiving input data of a current block, checking if the current block satisfies one or more predefined criteria, setting the current block to be a root block if the current block satisfies the predefined criteria, one or more color components of one or more blocks in the current block are not checked with the predefined criteria if the current block is a root block, encoding or decoding the one or more color components of one or more blocks in the current block using neighboring reconstructed samples of the one or more color components of the current block as reference samples if the current block is a root block. Each block in the current block is encoded or decoded using neighboring reconstructed samples of each block in the current block as reference samples if the current block is not a root block.

7 Claims, 13 Drawing Sheets

Related U.S. Application Data continuation of application No. 17/283,332, filed as application No. PCT/CN2019/110160 on Oct. 9, 2019, now Pat. No. 11,178,397.

(60) Provisional application No. 62/818,314, filed on Mar. 14, 2019, provisional application No. 62/767,609, filed on Nov. 15, 2018, provisional application No. 62/743,284, filed on Oct. 9, 2018.

(51) Int. Cl.
*H04N 19/132* (2014.01)
*H04N 19/159* (2014.01)
*H04N 19/176* (2014.01)
*H04N 19/186* (2014.01)

(56) References Cited

U.S. PATENT DOCUMENTS

| | | | | |
|---|---|---|---|---|
| 2013/0034157 A1* | 2/2013 | Helle | H04N 19/463 | |
| | | | 375/E7.243 | |
| 2013/0107970 A1* | 5/2013 | Wang | H04N 19/186 | |
| | | | 375/240.18 | |
| 2014/0086502 A1* | 3/2014 | Guo | H04N 19/182 | |
| | | | 382/238 | |
| 2015/0043641 A1* | 2/2015 | Gamei | H04N 19/124 | |
| | | | 375/240.12 | |
| 2016/0156932 A1* | 6/2016 | Lee | H04N 19/159 | |
| | | | 375/240.13 | |
| 2017/0339403 A1* | 11/2017 | Min | H04N 19/105 | |
| 2017/0347128 A1* | 11/2017 | Panusopone | H04N 19/174 | |
| 2017/0366818 A1* | 12/2017 | Zhang | H04N 19/159 | |
| 2019/0182481 A1* | 6/2019 | Lee | H04N 19/103 | |
| 2020/0036985 A1* | 1/2020 | Jang | H04N 19/186 | |
| 2020/0053385 A1* | 2/2020 | Lee | H04N 19/573 | |
| 2020/0275100 A1* | 8/2020 | Lee | H04N 19/70 | |
| 2021/0176493 A1* | 6/2021 | Wang | H04N 19/593 | |

FOREIGN PATENT DOCUMENTS

| | | |
|---|---|---|
| WO | 2016/115981 A1 | 7/2016 |
| WO | 2017/144017 A1 | 8/2017 |
| WO | 2018/026219 A1 | 2/2018 |
| WO | 2018/028615 A1 | 2/2018 |
| WO | 2018/062921 A1 | 4/2018 |

OTHER PUBLICATIONS

Hsu, C.W., et al.; "Description of SDR video coding technology proposal by MediaTek;" Joint Video Experts Team (JVET) of ITU-T SG 16 WP 3 and ISO/IEC JTC 1/SC 29/WG 11; Apr. 2018; pp. 1-160.

Office Action dated Jul. 20, 2023, issued in application No. CA 3,113,854 (copy not provided).

European Search Report dated Jun. 9, 2022, issued in application No. EP 19870546.9.

* cited by examiner

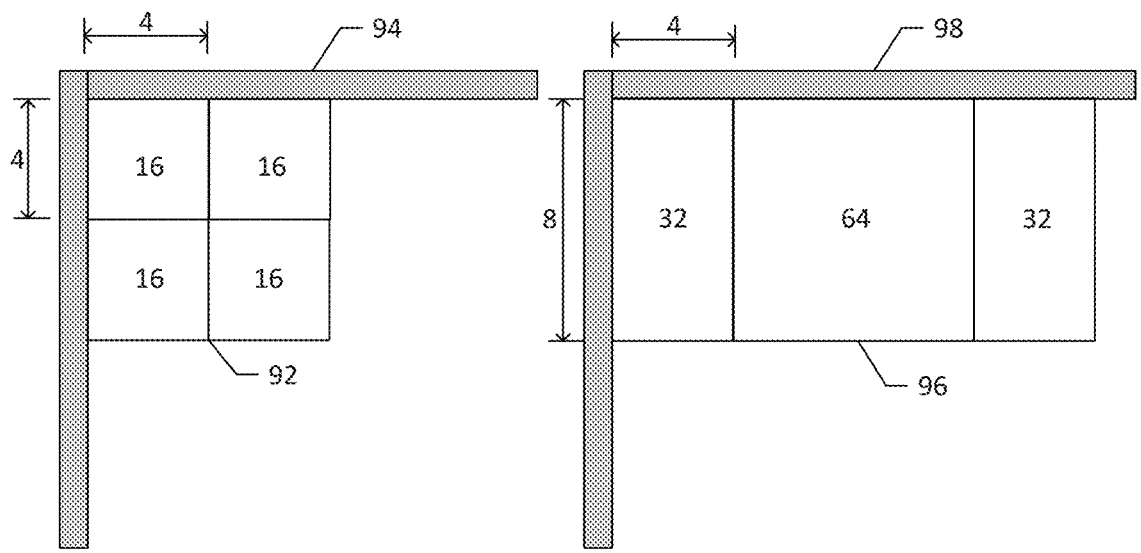
Fig. 9A  Fig. 9B
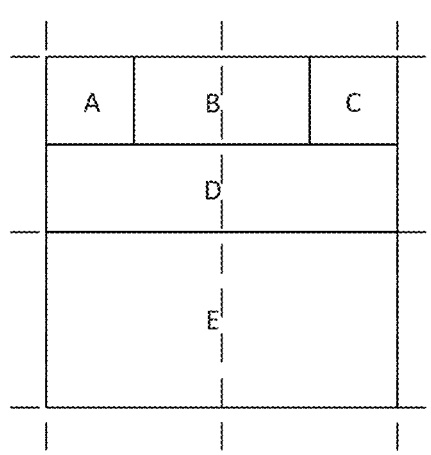 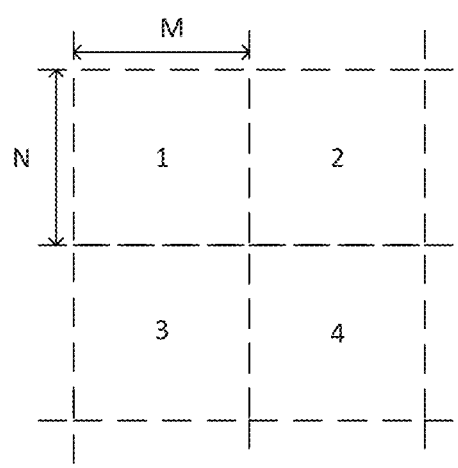
Fig. 10A  Fig. 10B

METHOD AND APPARATUS OF ENCODING OR DECODING USING REFERENCE SAMPLES DETERMINED BY PREDEFINED CRITERIA

CROSS REFERENCE TO RELATED APPLICATIONS

The present invention is a Continuation of pending U.S. application Ser. No. 17/503,595, filed on Oct. 18, 2021 (now abandoned), which is a Continuation of Ser. No. 17/283,332, filed on Apr. 7, 2021 (now U.S. Pat. No. 11,178,397), which is a 371 National Phase Application of pending PCT Application No. PCT/CN2019/110160, filed on Oct. 9, 2019, which claims priority to U.S. Provisional Patent Application, Ser. No. 62/743,284, filed on Oct. 9, 2018, entitled "Intra prediction using shared reference samples", U.S. Provisional Patent Application, Ser. No. 62/767,609, filed on Nov. 15, 2018, entitled "Intra prediction using shared reference samples", and U.S. Provisional Patent Application, Ser. No. 62/818,314, filed on Mar. 14, 2019, entitled "Intra prediction with reference samples restrictions". The above U.S. Provisional Patent Applications are hereby incorporated by reference in their entireties.

TECHNICAL FIELD

The present invention relates to encoding or decoding video data using neighboring reference samples in video processing. In particular, the present invention relates to encoding and decoding video data with reference samples determined based on predefined criteria.

BACKGROUND

Intra prediction has been widely adopted in various image and video coding standard to process an initial picture or to periodically insert I-picture or I-blocks for random access or for alleviation of error propagation. Intra prediction is designed to exploit spatial features in the picture such as smooth area, vertical line or edge, horizontal line or edge, and diagonal line or edge within a picture or within a picture region. Intra prediction is also useful for regions with high motion or scene changes. For a block-based video coding standard, intra prediction for a current block is relied upon samples in neighboring blocks that have been processed. For example, if blocks in a picture or picture region are sequentially processed row by row from top to bottom and from left to right, neighboring blocks on the top and neighboring blocks on the left of the current block can be used to form an intra predictor for predicting samples in the current block.

The High-Efficiency Video Coding (HEVC) standard supports 35 intra prediction modes including 33 angular modes, DC mode and Planar mode. FIG. 1 illustrates the prediction directions for the 33 angular intra prediction modes supported in the HEVC standard, where H represents Horizontal direction mode and V represents Vertical direction mode. An intra predictor for a current block coded or to be coded by intra prediction of HEVC is generated by three steps including intra smoothing filter, intra prediction and intra gradient filter. FIG. 2 illustrates exemplary reference samples filtered by an intra smoothing filter for deriving an intra predictor for a current block. A smoothing operation is applied to reference samples 22 of the current block 20 as a pre-processing step before calculating the intra predictor for the current block 20. The smoothing operation corresponds to applying a Finite Impulse Response (FIR) intra smoothing filter, [1 2 1]>>2, with low-pass characteristics to the reference samples 22 belonging to a left neighboring column and an above neighboring row of the current block 20. The smoothing operation reduces the discontinuities introduced by some of the intra prediction modes by applying the FIR filter. This smoothing operation is adaptively applied depending on an intra prediction mode and the size of the current block.

The second step of intra prediction is to derive the intra predictor from neighboring reference samples according to one intra prediction mode selected from the 35 intra prediction modes. The intra prediction mode is decided by the encoder and signaled in the bitstream so the corresponding decoder may parse the intra prediction mode from the bitstream. The value of each sample in the current block is predicted by extrapolating the samples from the reference samples according to the prediction direction of the selected angular mode when an angular mode is selected. The value of each sample in the current block is calculated assuming an amplitude surface with a horizontal and vertical smooth gradient derived from the boundaries samples of the neighboring blocks when Planar mode is selected. The value of each samples of the current block is an average of the reference samples when DC mode is selected.

An intra gradient filter is applied to samples at the left and top boundaries of the current block in the third step. The concept of applying the intra gradient filter is to utilize the gradient information along the intra prediction direction to improve the quality of intra prediction. FIG. 3A illustrates applying an intra gradient filtering to a predictor predicted by Vertical mode or Horizontal mode. In FIG. 3A, a predicted pixel Pij denotes the predictor at row i and column j, and AL represents a reconstructed sample at the left-above corner of the current block while Li represents a reconstructed sample in the left neighboring column of the current block. A final predicted pixel P'ij for each predicted pixel Pij is calculated by Equation (1) after applying the intra gradient filter.

$$P'ij = Pij + \alpha \cdot (Li - AL) \qquad \text{Equation (1)}$$

where $\alpha$ is a fraction from 0 to 1 and is selected according to the horizontal displacement j, for example, $\alpha=\frac{1}{2}$ when j=0, and $\alpha=\frac{1}{4}$ when j=1. As for a current block predicted by Horizontal mode, a final predicted pixel P'ij for each predicted pixel Pij is calculated by Equation (2).

$$P'ij = Pij + \alpha \cdot (Aj - AL) \qquad \text{Equation (2)}$$

where Aj is a reconstructed sample in the above row. As for the directional modes v+1~v+8 and h+1~h+8, a corresponding reference sample RLi or RAj of the reconstructed sample Li or Aj is first obtained along the direction of intra prediction to replace the reconstructed sample Li or Aj. Interpolation of integer pixels in the above row or the left column of the current block is applied to generate the corresponding reference sample RLi or RAj when it is not located at the position of an integer pixel. FIG. 3B illustrates examples of applying the intra gradient filter for v+1~v+8 directional modes. A final predicted pixel P'ij is calculated from each predicted pixel Pij according to Equation (3).

$$P'ij = Pij + \alpha \cdot (Li - RLi) \qquad \text{Equation (3)}$$

Similar to Vertical mode, a is a fraction from 0 to 1 and is selected according to the direction of intra prediction and the horizontal displacement j. As for h+1~h+8 directional modes, the final predicted pixel P'ij is calculated from each predicted pixel Pij according to Equation (4), where a is a fraction from 0 to 1 and is selected according to the direction of intra prediction and the vertical displacement i.

$$P'ij = Pij + \alpha \cdot (Aj - RAj) \qquad \text{Equation (4)}$$

Although the intra gradient filter can be applied in all directional modes v+1~v+8 and h+1~h+8, the intra gradient filter is only applied when the intra prediction mode is DC, Horizontal, or Vertical mode in the HEVC standard. The samples in the first row and first column of the current block are filtered by the intra gradient filter when the selected intra prediction mode is DC mode. The samples in the first row are filtered by the intra gradient filter when the selected intra prediction mode is Horizontal mode, and the samples in the first column are filtered by the intra gradient filter if the selected intra prediction mode is Vertical mode.

Besides intra gradient filtering, another method, which is called bi-directional intra prediction, was proposed to improve the quality of intra prediction. For diagonal intra prediction modes, including v+1~v+8 and h+1~h+8 directional modes, a weighted sum of reconstructed samples of an above row and reconstructed samples of a left column along the prediction direction is used as the intra predictor. FIG. 4 illustrates examples of bi-directional intra prediction for v+1~v+8 directional modes. In FIG. 4, a predicted sample Pij is taken from a neighboring sample of the above row, and it has a corresponding reference sample Fij in the left column along the prediction direction. If the corresponding reference sample Fij is not located at the position of an integer pixel, Fij is generated with interpolation of integer pixels in the left column according to the prediction direction. A final predicted sample P'ij is calculated as a weighted sum of Pij and Fij as shown in Equation (5).

$$P'ij = \alpha \cdot Pij + (1 - \alpha) \cdot Fij \qquad \text{Equation (5)}$$

where $\alpha$ is a fraction from 0 to 1 and is selected according to the direction of intra prediction together with the horizontal displacement j for v+1~v+8 directional modes or with the vertical displacement i for h+1~h+8 directional modes.

Out of the 35 intra prediction modes supported in the HEVC standard, three intra prediction modes are considered as Most Probable Modes (MPMs) for predicting a current intra prediction mode for a current block. Neighboring intra prediction modes of a left neighboring block and an above neighboring block are included in the three MPMs. In case the two neighboring intra prediction modes are the same directional mode, or only one of the two neighboring intra prediction modes is available and is a directional mode, two neighboring directions immediately next to this directional mode are also included in the three MPMs. DC mode and Planar mode are also considered as MPMs when the left or above neighboring intra prediction mode is not directional or when the neighboring blocks are not available or not coded in intra prediction. A first MPM flag is signaled to indicate whether the current intra prediction mode is identical to one of the three MPMs, if so, another flag is sent to indicate which of the three MPMs is selected; if the first MPM flag is false, the current intra prediction mode is a non-MPM mode and is explicitly signaled using a 5-bit fixed length codeword.

The 33 angular modes shown in FIG. 1 can be expanded to a general case with more or less angular modes, where each of the angular modes can be represented by mode H+k or mode V+k, where H represents the direction of Horizontal mode, V represents the direction of Vertical mode, and k=0, +−1, +−2, . . . +−K. An example of 65 angular modes for intra prediction is shown in FIG. 5, where k is ranged from −16 to 16, and mode H−16 and mode V−16 are the same mode as this mode refers to the prediction direction from an upper-left corner to the center of the current block. FIG. 5 illustrates the 65 angular intra prediction modes with additional 32 angular modes in between the original 33 angular modes of HEVC. The 65 angular modes in FIG. 5 include modes H+16 to H−15 from bottom to top at the left boundary of the block and modes V−16 to V+16 from left to right at the upper boundary of the block.

In the HEVC standard, once a directional mode is decided, along the prediction direction, all the samples in the current block use the same predictor value. If the predictor falls in between two reconstructed reference samples, a bi-linear filter is used to calculate the predictor as a weighted average of the two neighboring reconstructed samples. For example, P=[P1*a+P2(32−a)]/32, where P is the predictor, P1 and P2 are the two neighboring reconstructed samples, and integer a represents a distance from the predictor P to P2, which is between 0 and 32 inclusively.

A predictor error between original samples and predicted samples of a current block is further processed by transform and quantization after generating the intra predictor for the current block. Quantized coefficients are divided into multiple 4×4 coefficient groups in an entropy coding engine, and the coding order of different coefficient groups and scan order of coefficients in one coefficient group are selected according to the intra prediction mode and the transform size of the current block. Intra-mode-dependent scan is used for the coding order of different coefficient groups and the scan order of coefficients in one coefficient group if the transform size is smaller than or equal to 8×8, otherwise, diagonal scan is used for the coding order of different coefficient groups and the scan order of coefficients in one coefficient group.

FIG. 6 illustrates a process of Multiple Parameter Intra prediction (MPI). MPI generates a final predictor for intra prediction by calculating a weighted sum of several predictors. The final predictor $P_{MPI}[i, j]$ of position (i, j) in a current block is defined in Equation (6).

$$P_{MPI}[i, j] = \qquad \text{Equation (6)}$$
$$(\alpha P_{HEVC}[i, j] + \beta P_{MPI}[i-1, j] + \gamma P_{MPI}[i, j-1] +$$
$$\delta P_{MPI}[i-1, j-1] + 4) \gg 3$$

where $P_{HEVC}[i, j]$ is an initial predictor generated by intra prediction defined in the HEVC standard, and >>represents bit-shift-to-the-right. The final predictor $P_{MPI}[i, j]$ of position (i, j) outside of the current block is equal to the reconstructed pixel as shown in Equation (7).

$$P_{MPI}[i, j] = REC[i, j] \text{ if } < 0 || j < 0 \qquad \text{Equation (7)}$$

The four parameters in Equation (6) added up to 8 (i.e. $\alpha+\beta+\gamma+\delta=8$), and the strength of this post-processing is controlled in CU level and is signaled with up to 2 bits.

FIG. 7 illustrates a technique of generating a final predictor p [x,y] for a current block using a combination of filtered and unfiltered reference samples, where x and y are horizontal and vertical distances from the block boundary. The sequences with unfiltered references r [x, −1] 704 and r [−1, y] 706 located around the current block 702 and a filtered predictor q [x,y] 708 are used to calculate the final predictor p [x,y]. The filtered predictor q[x,y] 708 is derived from filtered samples s [x, −1] 710 and s [−1, y] 712 as shown in FIG. 7. The final predictor p[x,y] combines weighted values of the unfiltered references 704 and 706 with the filtered predictor 708 according to Equation (8).

$$p[x, y] = \{(c_1^{(v)} \gg \lfloor y/d \rfloor) r[x, -1] - \qquad \text{Equation (8)}$$
$$(c_2^{(v)} \gg \lfloor y/d \rfloor) r[-1, -1] + (c_1^{(h)} \gg \lfloor x/d \rfloor) r[-1, y] -$$
$$(c_2^{(h)} \gg \lfloor x/d \rfloor) r[-1, -1] + b[x, y] q[x, y] + 64\} \gg 7$$

where $c_1^v, c_2^v, c_1^h, c_2^h$ are stored prediction parameters, d=1 for block sizes up to 16×16, and d=2 for larger blocks. A normalization factor b[x,y] is defined in Equation (9).

$$b[x, y] = 128 - (c_1^{(v)} \gg \lfloor y/d \rfloor) + \qquad \text{Equation (9)}$$
$$(c_2^{(v)} \gg \lfloor y/d \rfloor) - (c_1^{(v)} \gg \lfloor y/d \rfloor) + (c_2^{(h)} \gg \lfloor y/d \rfloor)$$

FIG. 8A and FIG. 8B illustrate computing an intra predictor of a current block by Planar mode in intra prediction. A sample at the bottom-right corner of the current block is first predicted by either signaling or estimating using linear average of a corresponding left reference sample and an above reference sample. Samples in the right most column are bi-linearly interpolated using a sample above the right most column of the current block and the bottom-right corner sample, and samples in the bottom row are bi-linearly interpolated using the sample at the left of the bottom row of the current block and the bottom-right corner sample as shown in FIG. 8A. The remaining samples of the intra predictor are predicted using similar bi-linear interpolation as shown in FIG. 8B.

SUMMARY

A method and apparatus for processing video data with neighboring reconstructed samples determined based on one or more predefined criteria in a video coding system are disclosed. Embodiments of a video coding system receive input data associated with a current block in a current picture. The current block is checked with the one or more predefined criteria during partitioning of the current block, and the current block is set as a root block if the current block satisfies the predefined criteria. One or more predefined criteria are not checked in one or more color components of one or more blocks in the current block if the current block satisfies the one or more predefined criteria. The one or more color components of one or more blocks in the current block are encoded or decoded using neighboring reconstructed samples of the one or more color components of the current block as reference samples if the current block is set to be a root block, otherwise, the one or more color components of each block in the current block is encoded or decoded using neighboring reconstructed samples of the one or more color components of each block in the current block as reference samples if the current block is not a root block. The reconstructed samples within the current block are not used as reference samples to encode or decode the one or more color components of one or more blocks in the current block if the current block is set to be a root block. The method is applied to intra prediction or any coding tool requiring neighboring reference samples or neighboring information. In an embodiment of applying the method to intra prediction, an intra predictor is generated for the one or more color components of each block in the current block according to an intra prediction mode and the neighboring reconstructed samples of the one or more color components of the current block if the current block is set as a root block. An intra predictor for the one or more color components of each block in the current block is generated according to an intra prediction mode and neighboring reconstructed samples of the one or more color components of each block in the current block if the current block is not set as a root block.

In some embodiments, the one or more color components only correspond to one or more chroma components as chroma blocks are smaller than the corresponding luma block, so the method of defining root blocks for sharing neighboring reconstructed samples or neighboring information is only applied to small chroma blocks, whereas in some other embodiments, the method is applied to all luma and chroma components.

In some embodiments, the one or more color components correspond to one or more chroma components, the one or more chroma components of one or more blocks in the current block are encoded or decoded using neighboring reconstructed samples of the one or more chroma components of the current block as reference samples, and a luma component of each block in the current block is encoded or decoded using neighboring reconstructed samples of the luma component of each block in the current block as reference samples, if the current block is set to be a root block. Otherwise, one or more color components of each block in the current block is encoded or decoded using neighboring reconstructed samples of the one or more color components of each block in the current block as reference samples if the current block is not a root block. In one embodiment, the method further comprises checking whether a root block has been set, and the current block is set to be a root block only when the root block has not been set and the current block satisfies the predefined criteria. The current block is a luma block or a chroma block. One of the predefined criteria may be related to a size of the current block, in an embodiment, the current block satisfies the predefined criterion if the size of the current block is less than, equal to, or less than or equal to a predefined threshold. The size corresponds to a luma sample size or a chroma sample size. In one embodiment, one criterion is related to a size of the current block and another criterion is related to a size of one children block split from the current block, and the current block satisfies the predefined criteria if the size of the current block is larger than, equal to, or larger than or equal to a predefined threshold and the size of one children block is less than, equal to, or less than or equal to another predefined threshold. The size of the children block corresponds to a luma sample size or a chroma sample size. In another embodiment, one criterion is related to a size of the current block and another criterion is related to a splitting type for partitioning the current block.

In some embodiments, the predefined criteria are related to one or a combination of a size of the current block, a width of the current block, a height of the current block, a depth of the current block, an average depth of neighboring blocks of the current block, a splitting type for partitioning the current block, a size of one children block split from the current block, a width of one children block split from the current block, a height of one children block split from the current block, a depth of one children block split from the current block, and an average depth of neighboring blocks of one children block split from the current block. The size, width, and height correspond to a luma sample size, a luma sample width, and a luma sample height, or a chroma sample size, a chroma sample width, and a chroma sample height. Some embodiments of the processing method further check if one children block split from the current block satisfies one or more second criteria, and the current block is set to be a root block if the current block satisfies the one or more predefined criteria and the children block satisfies the one or more second criteria. For example, the one or more second criteria are related to a size, width, height, both width and height, or depth of the children block split from the current block. All other children blocks split from the current block are not checked with the one or more predefined criteria checked with the current block and the one or more second criteria if the current block is set to be a root block.

In some embodiments, the processing method further comprises checking if a parent block of the current block satisfies a second criterion, and the current block is set to be a root block if the current block satisfies the one or more predefined criteria and the parent block satisfies the second criterion.

Luma samples within the root block or chroma samples within the root block are treated as unavailable when encoding or decoding the one or more color components of one or more blocks in the root block, and a sample filling process or an intra boundary sample generation process may be applied to generate the unavailable samples when these luma or chroma samples are required for predicting the one or more block in the root block. In some examples, the unavailable samples are generated by copying adjacent samples of the unavailable samples or using one or more default values.

A root block position is set to be a top-left position of the current block, and a width and height of the root block is set equal to a width and height of the current block if the current block is set to be the root block.

Some embodiments of the processing method derive Most Probable Mode (MPMs) of the one or more color components of the one or more blocks in the current block are derived from intra prediction modes of neighboring blocks of the current block if the current block is set to be a root block.

Aspects of the disclosure further provide an apparatus in a video coding system for receiving input data associated with a current block, checking if the current block satisfies one or more predefined criteria during partitioning, setting the current block to be a root block if the current block satisfies the predefined criteria, and encoding or decoding one or more color components of one or more blocks in the current block using neighboring reconstructed samples of the one or more color components of the current block as reference samples if the current block is set to be a root block.

Aspects of the disclosure further provide a non-transitory computer readable medium storing program instructions for causing a processing circuit of an apparatus to encode or decode video data by determining reference samples based on one or more predefined criteria. Other aspects and features of the invention will become apparent to those with ordinary skill in the art upon review of the following descriptions of specific embodiments.

BRIEF DESCRIPTION OF DRAWINGS

Various embodiments of this disclosure that are proposed as examples will be described in detail with reference to the following figures, wherein like numerals reference like elements, and wherein:

FIGS. 9A and 9B illustrate children blocks of a current block use reference samples of the current block for intra prediction according to embodiments of the present invention.

FIGS. 10A and 10B illustrate sharing neighboring reference samples determined based on predefined root blocks according to an embodiment of the present invention.

DETAILED DESCRIPTION

Figure 1:
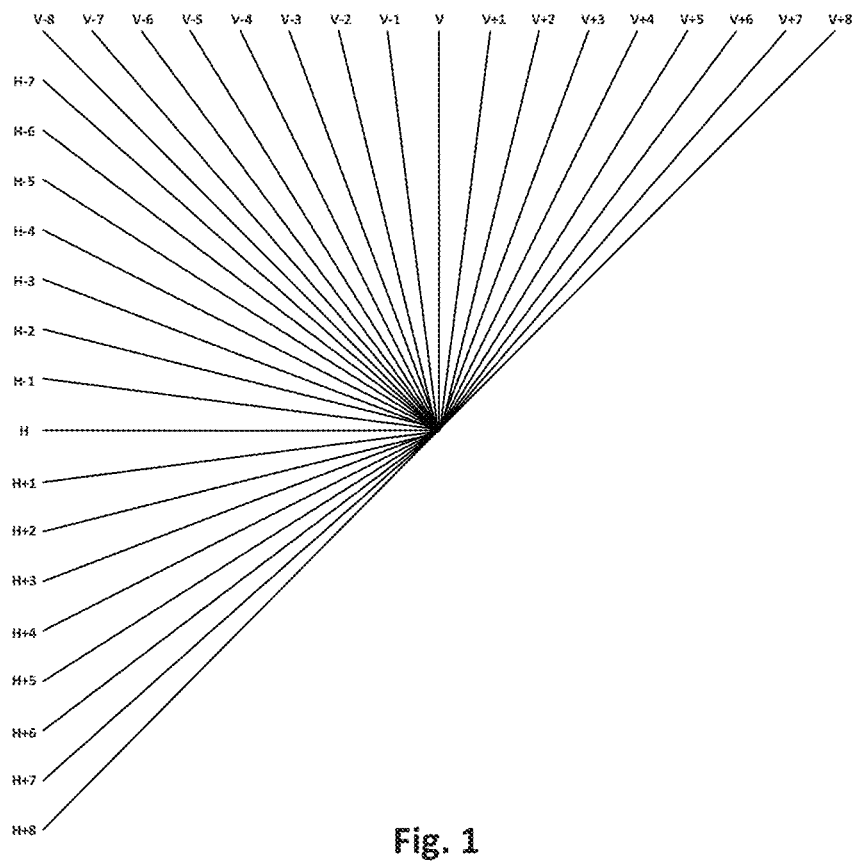
FIG. 1 illustrates 33 angular intra prediction modes supported in the HEVC standard.
Figure 2:
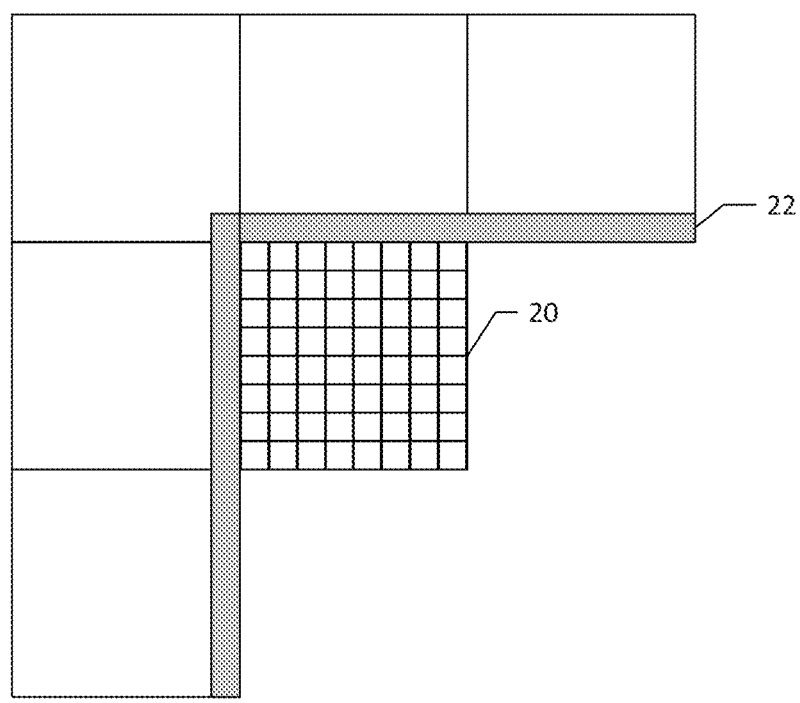
FIG. 2 illustrates exemplary reference samples filtered by an intra smoothing filter for deriving an intra predictor for a current block.
Figure 3A:
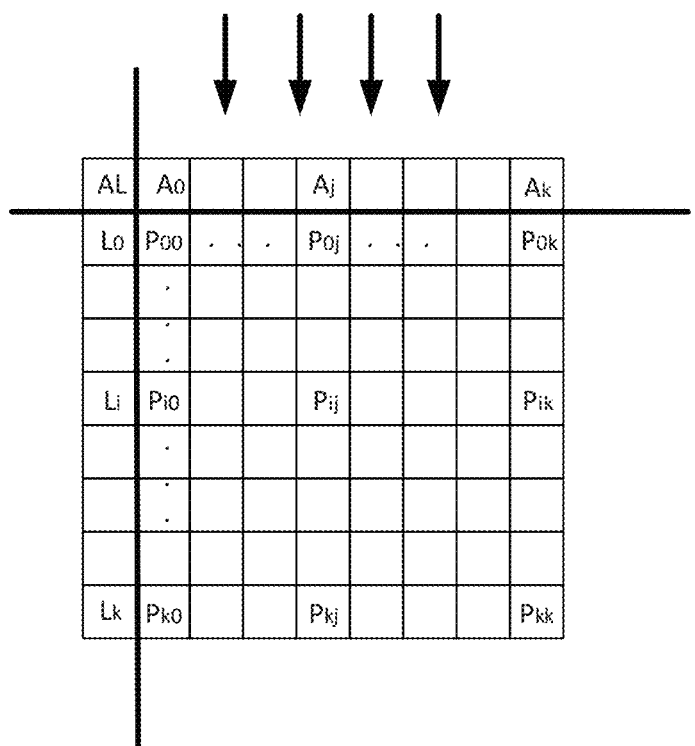
FIG. 3A illustrates applying an intra gradient filtering to a predictor predicted by Vertical mode in intra prediction.
Figure 3B:
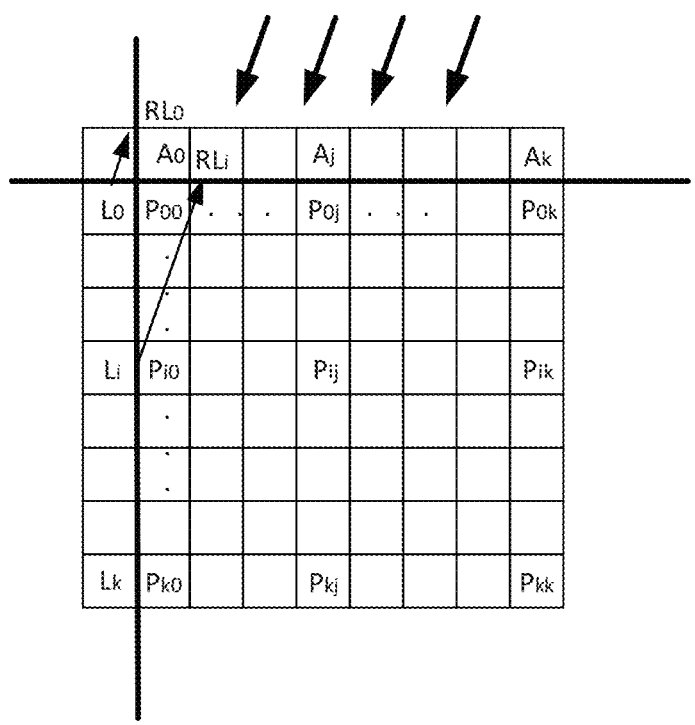
FIG. 3B illustrates applying an intra gradient filtering to a predictor predicted by an angular mode in intra prediction.
Figure 4:
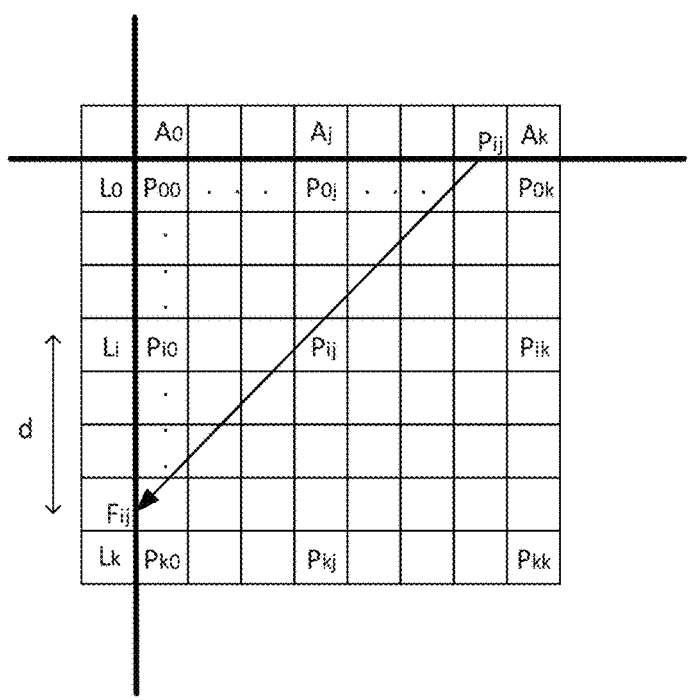
FIG. 4 illustrates an example of bi-directional intra prediction for v+1~v+8 directional modes.
Figure 5:
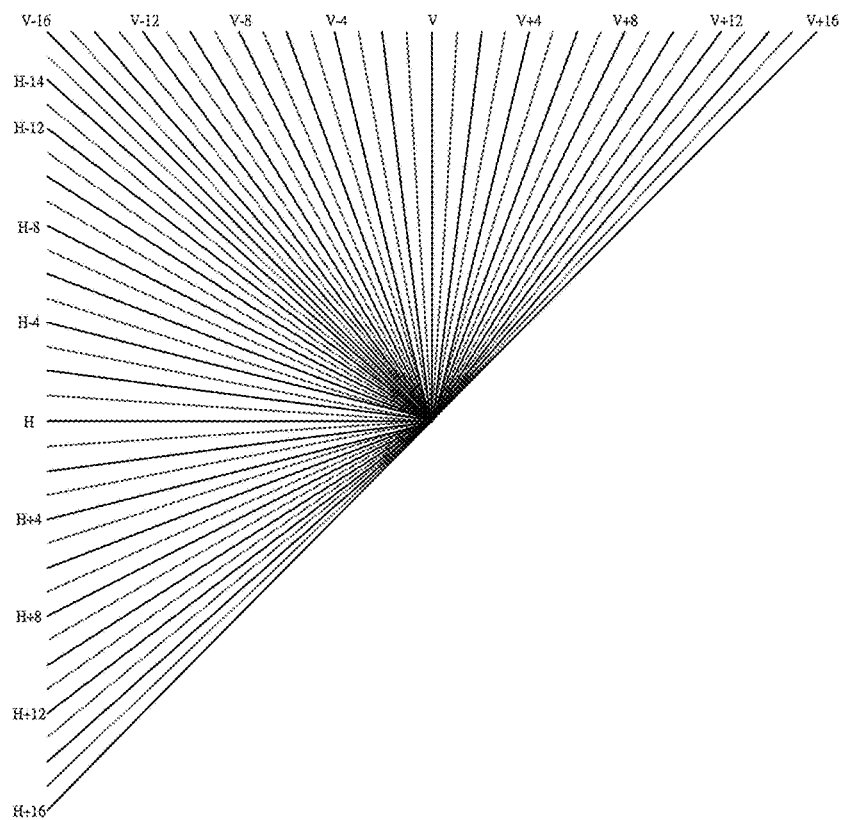
FIG. 5 illustrates an example of 65 angular intra prediction modes.
Figure 6:
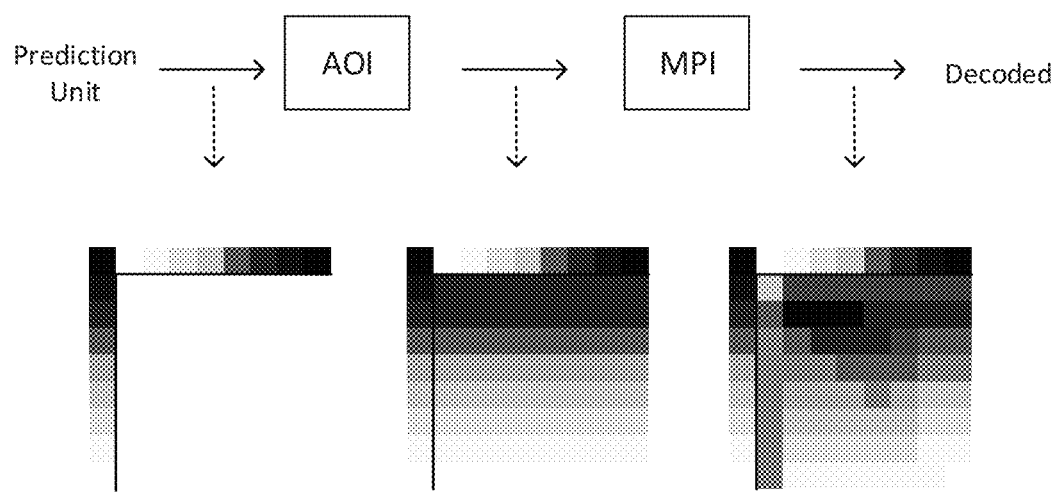
FIG. 6 illustrates an example of multi-parameter intra prediction.
Figure 7:
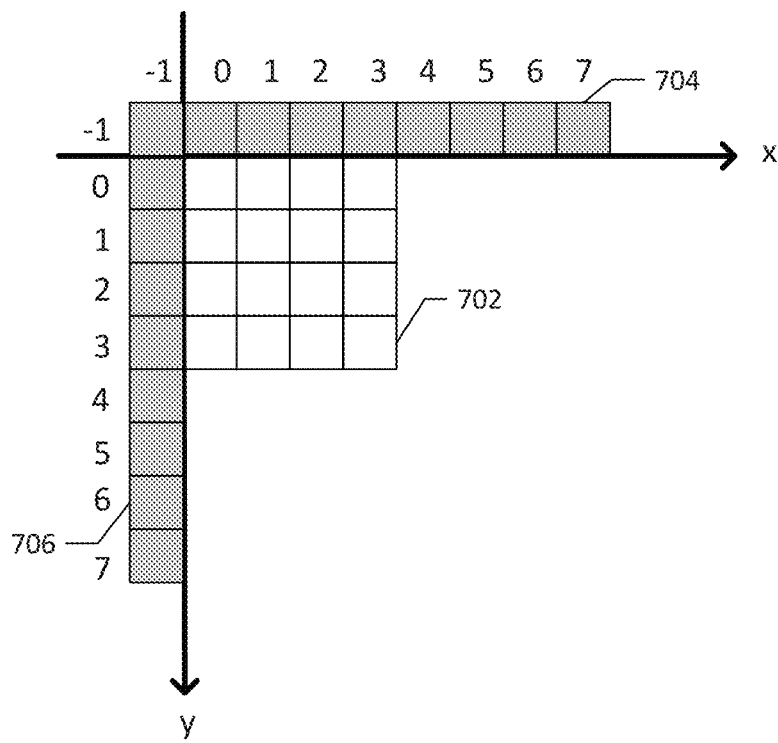
FIG. 7 illustrates generating a final predictor for a current block using a combination of filtered and unfiltered reference samples.
Figure 7:
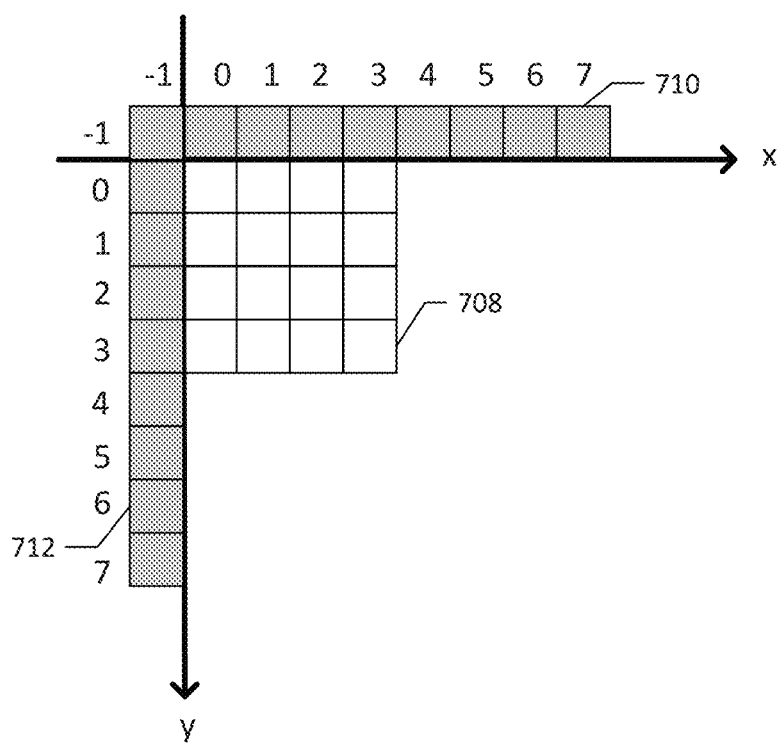
Figure 8A:
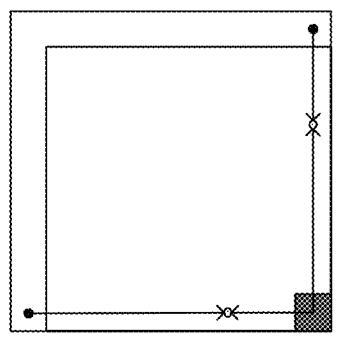
FIGS. 8A and 8B illustrate generating a predictor for a current block by Planar mode in intra prediction.
Figure 8B:
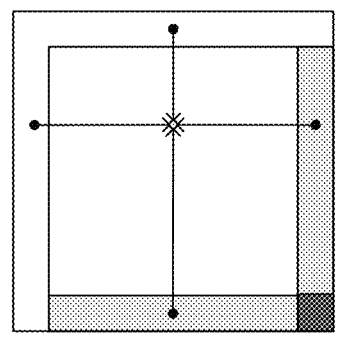

It will be readily understood that modules and components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Neighboring reconstructed samples of one or more color components of a current block are used as reference samples for predicting the current block coded in intra prediction. The processing throughput is restricted depending on the block size because the processor can only predict at most the entire current block at once if the current block is coded in intra prediction. Parallel processing for multiple intra coded blocks is prohibited as prediction for each of these intra coded blocks cannot be conducted until corresponding neighboring reconstructed samples are available. The coding performance may be improved when video pictures can be partitioned into small blocks, however, the processing throughput cannot be improved if there are small blocks predicted by intra prediction. Embodiments of the present invention improve the processing throughput by setting a root block for blocks coded in intra prediction or processed by any coding tool requiring neighboring reconstructed samples or neighboring information, so same neighboring reference samples along the root block boundary are shared within one or more color components of one or more blocks in the root block.

In some embodiments, a root block is defined by one or more predefined criteria or a predefined size, and the root block is used to determine reference samples for blocks coded in normal intra modes, Linear Model (LM) mode for predicting chroma from luma in intra prediction, and intra inter mode. An exemplary restriction for defining root blocks restricts all root blocks to be within a frame boundary, so root blocks are not allowed to exceed the frame boundary.

Setting Current Block as Root Block if Current Block Satisfying Predefined Criteria In various embodiments of the present invention, a current block is checked with one or more predefined criteria during partitioning, and if the current block satisfies the one or more predefined criteria, the current block is set to be a root block. One or more color components of one or more blocks in the current block use neighboring reconstructed samples along a boundary of the current block for intra prediction or any tool that requires neighboring reconstructed samples or neighboring information if the current block is set as a root block. One or more color components of the current block may be partitioned into multiple blocks, and once the current block is set as a root block, neighboring reconstructed samples or neighboring information within the current block cannot be used by any block in the current block. For example, each chroma block in the current block cannot retrieve neighboring samples inside the current block as reference samples for intra prediction when the current block is set as a root block. The one or more color components of one or more blocks in the current block will not be checked with the same predefined criteria if the current block already satisfies the predefined criteria. The one or more color components of each block in the current block use neighboring reconstructed samples along a boundary of each block in the current block if the current block does not satisfy the one or more predefined criteria. For example, an encoder or decoder generates an intra predictor for each block in the current block according to an intra prediction mode and the neighboring reconstructed samples of one or more color components of the current block if the current block is set as a root block; otherwise the encoder or decoder generates an intra predictor for each block in the current block according to an intra prediction mode and neighboring reconstructed samples of one or more color components of each block in the current block if the current block is not a root block.

The one or more color components include both luma and chroma components according to one embodiment; and the one or more color components only include the luma component or one or more of the chroma components according to other embodiments. In an exemplary embodiment, one or more chroma components of one or more blocks in a current block are encoded or decoded using neighboring reconstructed samples of the one or more chroma components of the current block as reference samples if the current block is set to be a root block; and a luma component of each block in the current block is encoded or decoded using neighboring reconstructed samples of the luma component of each block in the current block as reference samples if the current block is set to be a root block.

In one embodiment, a root block corresponds to a current block is defined for deriving Most Probable Modes (MPMs) for encoding or decoding the current block by intra prediction. According to the HEVC standard, the MPMs of each block inside the current block are derived from intra prediction modes of above and left neighboring blocks of each block in the current block, where the above or left neighboring block may also be within the current block. In this embodiment, the MPMs of each block inside the current block are derived from intra prediction modes of above and left neighboring block of the current block if the current block is set to be a root block. Intra prediction modes of neighboring blocks within the same root block cannot be used for MPM derivation.

In some other embodiments of utilizing a root block defined by one or more predefined criteria, for blocks within the root block, a sample reconstruction process, such as a predictor generation process, does not allow to use samples within the root block. The samples may refer to prediction samples or reconstruction samples of one or more color components. The sample reconstruction process uses boundary samples of the root block as reference samples for processing all blocks within the root block.

Intra prediction is referred in the following embodiments as a representative tool that uses neighboring reconstructed samples or neighboring information; however, various embodiments in the following may be applied to any other coding tool that requires neighboring reconstructed samples or neighboring information for encoding or decoding.

In one embodiment, one or more color components of the current block cannot be partitioned into children blocks once it is set as a root block, and the only block in the current block uses neighboring reconstructed samples of the one or more color components of the current block for intra prediction. In this embodiment, the one or more color components of the current block can be further partitioned into children blocks only if it is not a root block. In another embodiment, one or more color components of the current block can be further partitioned into children blocks regardless whether it is a root block, and all children blocks use neighboring reconstructed samples of the one or more color components of the current block as reference samples for intra prediction.

An embodiment of a criterion is related to a size of the current block, for example, the current block satisfies the criterion if the size of the current block is less than or equal to a predefined threshold, in another example, the current block satisfies the criterion if the size of the current block is less than a predefined threshold, and in yet another example, the current block satisfies the criterion if the size of the current block is equal to a predefined threshold. The size may be referred to a luma sample size or a chroma sample size. One or more color components of one or more blocks inside the current block share reference samples along the boundary of the current block for intra prediction and the same criterion is not checked in any of the one or more color components of the one or more blocks inside the current block once the current block satisfies the criterion. Some examples of the predefined threshold for the size are 4, 8, 16, 32, 64, 128, 256, 512, 1024, 2048, and 4096 samples. The present invention may be applied to luma component, chroma components, or both luma and chroma components. In an embodiment of applying the present invention only to chroma components, the current block is a chroma block and if a size of the current block is equal to a predefined threshold, for example, 16 chroma samples, one or more color components of one or more blocks inside the current block will use the same neighboring reconstructed samples along the current block as reference samples for intra prediction. The current block may be further split into smaller coding blocks, but these smaller coding blocks share the same reference samples for intra prediction and the same criterion is not checked again in any of the coding blocks in the current block.

Another embodiment of the criterion is related to a width or height of the current block, for example, the current block satisfies the criterion if the width of the current block is less than or equal to a predefined threshold, in another example, the current block satisfies the criterion if the width of the current block is less than a predefined threshold, and in yet another example, the current block satisfies the criterion if the width of the current block is equal to a predefined threshold. The width or height of the current block corresponds to a luma sample width or a luma sample height of the current block or a chroma sample width or a chroma sample height of the current block. One or more color components of one or more blocks in the current block use reference samples along the current block boundary for intra prediction and the same criterion is not checked in one or more color components of one or more blocks in the current block once the current block satisfies the criterion. An example of the criterion related to a height of the current block checks if the height of the current block is less than or equal to a predefined threshold, and the current block satisfies the criterion if the height of the current block is less than or equal to the predefined threshold. In another example, the current block satisfies the criterion if the height of the current block is equal to a predefined threshold or if the height of the current block is less than a predefined threshold. Similarly, one or more color components of one or more blocks in the current block use reference samples along the current block boundary for intra prediction and the same check is not performed in the one or more color components of one or more blocks in the current block when the current block satisfies the criterion. Some examples of the predefined threshold for the width or height are 2, 4, 8, 16, 32, 64, and 128 luma or chroma samples.

Some other embodiments of a criterion are related to a size and a width or height of the current block, for example, the current block satisfies the criterion if the size of the current block is less than or equal to a predefined threshold A, or the width or height of the current block is less than or equal to a predefined threshold B, in another example, the current block satisfies the criterion if the size of the current block is less than a predefined threshold A, or the width or height of the current block is less than a predefined threshold B, and in yet another example, the current block satisfies the criterion if the size of the current block is equal to a predefined threshold A, or the width or height of the current block is equal to a predefined threshold B. One or more color components of one or more blocks inside the current block share reference samples along the boundary of the current block for intra prediction and the same criterion is not checked in any of the one or more color components of one or more blocks inside the current block once the current block satisfies the criterion. Some examples of the predefined threshold A for the size are 4, 8, 16, 32, 64, 128, 256, 512, 1024, 2048, and 4096 luma or chroma samples. Some examples of the predefined threshold B for the width or height are 2, 4, 8, 16, 32, 64, and 128 luma or chroma samples. The present invention may be applied to luma component, chroma components, or both luma and chroma components. In an embodiment of applying the present invention only to chroma components, the current block is a chroma block and if a size of the current block is equal to a predefined threshold A, for example, 16 chroma samples, or a width of the current block is equal to a predefined threshold B, for example, 2 chroma samples, one or more color components of one or more blocks inside the current block will use the same neighboring reconstructed samples along the current block as reference samples for intra prediction. The current block may be further split into smaller coding blocks, but these smaller coding blocks share the same reference samples for intra prediction and the same criterion is not checked again in any of the coding blocks in the current block.

Some other embodiments of the predefined criteria relate to both width and height of a current block. The current block is set as a root block when the width satisfies one predefined criterion and the height satisfies one predefined criterion, and one or more color components of one or more blocks in the current block share reference samples of the current block for intra prediction. In one example, a root block for sharing neighboring reference samples is always square, and in another example, a root block for sharing neighboring reference samples can be square or non-square. In one exemplary embodiment, for a current block with a width larger than or equal to its height, if the width is less than a predefined threshold A and the height is less than another predefined threshold B, one or more children blocks in the current block use reference samples along the boundary of the current block for intra prediction and the criteria will not be checked in the one or more children blocks. Some examples of the predefined threshold A for the width are 2, 4, 8, 16, 32, 64, and 128 luma samples or chroma samples, and some examples of the predefined threshold B for the height are 2, 4, 8, 16, 32, 64, and 128 luma samples or chroma samples. The combination of threshold A and threshold B (thresA, thresB) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32) or (128, 64). For example, a combination of threshold A and threshold B is (128, 16), and a current block with a size equal to 64×8 satisfies the criteria defined by the two thresholds. If the current block is further split, for example, the current block is split by vertical binary tree partitioning into two 32×8 children blocks, the children blocks in the current block use same reference samples along the boundary of the current block for intra prediction, and the criteria defined by the two thresholds are not checked in the children blocks. In another embodiment, a height of a current block is larger than or equal to its width, and the current block satisfies predefined criteria if the height is less than a predefined threshold A and the width is less than another predefined threshold B. One or more color components of all children blocks in the current block use reference samples along the boundary of the current block for intra prediction and the predefined criteria will not be checked in the one or more color components of the children blocks if the current block satisfies the predefined criteria. Some examples of the threshold A for the height are 2, 4, 8, 16, 32, 64, and 128 luma samples or chroma samples, and some examples of the threshold B for the width are 2, 4, 8, 16, 32, 64, and 128 luma samples or chroma samples. A combination of the threshold A and threshold B (thresA, thresB) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32) or (128, 64). For example, a block satisfies predefined criteria when a height is less than or equal to 64 and a width is less than or equal to 8, and in this example, an 8 by 64 current block is further split into two 8 by 32 children blocks by horizontal binary tree partitioning, these two children blocks use same reference samples along the boundary of the 8×64 current block for intra prediction and predefined criteria will not be checked in the children blocks as the current block already satisfies the predefined criteria.

Some other embodiments of a criterion are related to a size, a width, and a height of the current block, for example, the current block satisfies the criterion if the size of the current block is less than or equal to a predefined threshold A, or the width and height of the current block are less than or equal to a predefined threshold B and threshold C, respectively, in another example, the current block satisfies the criterion if the size of the current block is less than a predefined threshold A, or the width and the height of the current block are less than a predefined threshold B and threshold C, respectively, and in yet another example, the current block satisfies the criterion if the size of the current block is equal to a predefined threshold A, or the width and the height of the current block are equal to a predefined threshold B and threshold C, respectively. One or more color components of one or more blocks inside the current block share reference samples along the boundary of the current block for intra prediction and the same criterion is not checked in any of the one or more color components of one or more blocks inside the current block once the current block satisfies the criterion. Some examples of the predefined threshold A for the size are 4, 8, 16, 32, 64, 128, 256, 512, 1024, 2048, and 4096 luma or chroma samples. Some examples of the predefined threshold B and threshold C for the width and height are 2, 4, 8, 16, 32, 64, and 128 luma or chroma samples. The present invention may be applied to luma component, chroma components, or both luma and chroma components. In an embodiment of applying the present invention only to chroma components, the current block is a chroma block and if a size of the current block is equal to a predefined threshold A, for example, 16 chroma samples, or a width of the current block is equal to a predefined threshold B, for example, 2 chroma samples, and a height of the current block is equal to a predefined threshold C, for example, 8 chroma samples, one or more color components of one or more blocks inside the current block will use the same neighboring reconstructed samples along the current block as reference samples for intra prediction. The current block may be further split into smaller coding blocks, but these smaller coding blocks share the same reference samples for intra prediction and the same criterion is not checked again in any of the coding blocks in the current block.

In some other embodiments, the predefined criterion is related to a depth of a current block, for example, the depth is a QuadTree (QT) depth or a Multi-Tree (MT) depth. In one embodiment, a current block satisfies a predefined criterion when a QT depth, MT depth, or both QT depth and MT depth of the current block is larger than, equal to, or larger than or equal to a predefined threshold. One or more children blocks in the current block share reference samples along the current block boundary for intra prediction and the same predefined criterion is not checked in one or more children blocks in the current block if the current block satisfies the predefined criterion. A possible predefined threshold for the depth may be 1, 2, 3, 4, or 5. For example, a predefined threshold is 2 and a block with a depth larger than 2 is set to be a root block for sharing reference samples along the root block. During partitioning, if a current block with a depth larger than 2 is further split, children blocks split from the current block use same reference samples along the current block boundary for intra prediction and the criterion related to the depth will not be checked in the children blocks. In another example, a predefined criterion is related to a weighted depth calculated from both QT depth and MT depth, and a current block satisfies the predefined criterion if the weighted depth is larger than a predefined threshold. The weighted depth, avg_depth, can be calculated by avg_depth=(A*QT depth+(2^B−A)*MT depth>>B). In one example, A is equal to 3 and B is equal to 3. One or more children blocks use reference samples along the boundary of the current block for intra prediction and the predefined criterion is not checked with the one or more children blocks if the current block already satisfies the predefined criterion.

In yet another embodiment, a predefined criterion is related to an average QT depth or an average MT depth of neighboring blocks of a current block. For example, a current block satisfies the predefined criterion if an average QT depth or MT depth of neighboring blocks of the current block is larger than a predefined threshold, and one or more children blocks in the current block use reference samples along the current block boundary for intra prediction if the current block satisfies the predefined criterion. Some examples of the predefined threshold for the average QT depth or average MT depth of the neighboring blocks are 1, 2, 3, 4, and 5.

A top-left position of a root block is sharedRootPos, a width of the root block is sharedRootWidth, and a height of the root block is sharedRootHeight. In one embodiment, a current block is set as a root block during partitioning if the current block satisfies one or more predefined criteria and the root block has not been set. A top-left position of the root block is set to be a top-left position of the current block and a width and a height of the root block equal to a width and a height of the current block if the current block is set as the root block, otherwise, the root block is not set.

Setting Current Block as Root Block if One Children Block Satisfying Predefined Criteria In some embodiments of the present invention, a current block satisfies one of the predefined criteria by comparing a predefined threshold with one children block split from the current block. The current block is set as a root block for sharing reference samples if the current block satisfied the predefined criterion according to one children block split from the current block. Reference samples of the current block are used by all children blocks in the current block if the current block is set as a root block. An embodiment of a predefined criterion is related to a size of one children block, and the size corresponds to a luma sample size or a chroma sample size. For example, a current block is set as a root block if a size of one children block split from the current block is less than, equal to, or less than or equal to a predefined threshold, and the predefined threshold for the size can be 4, 8, 16, 32, 64, 128, 256, 512, 1024, 2048, or 4096 luma samples or chroma samples.

FIG. 9A and FIG. 9B illustrate two examples of setting a current block to be a root block according to a predefined criterion related to a size of a children block in the current block. In the examples shown in FIGS. 9A and 9B, the predefined criterion checks if a size of any children block in the current block is less than 64 luma samples. In FIG. 9A, a current block 92 with a size equal to 64 luma samples is split into four children block by quadtree partitioning, and the size of each children block is 16 luma samples. The current block 92 in FIG. 9A satisfies the predefined criterion because the size of the children blocks is less than 64, so the current block 92 is set as a root block for sharing reference samples. All the four children blocks in the current block 92 (or called all four blocks inside the current block 92) use reference samples 94 of the current block for intra prediction as shown in FIG. 9A. A size of a current block 96 in FIG. 9B is 128 luma samples, and the current block 96 is split into three children blocks by vertical ternary tree partitioning. Sizes of the children blocks are 32, 64, and 32 luma samples. The current block 96 is set as a root block for sharing reference samples as the size of at least one children block is less than 64 luma samples. The three children blocks in the current block 96 use reference samples 98 of the current block for intra prediction.

In another example, FIG. 9A and FIG. 9B illustrate two examples of setting a current block to be a root block according to a predefined criterion related to a corresponding chroma size of a children block in the current block. In the examples shown in FIGS. 9A and 9B, the predefined criterion checks if a chroma size of any children block in the current block is less than 16 chroma samples. In FIG. 9A, a current block 92 with a size equal to 16 chroma samples is split into four children block by quadtree partitioning, and the chroma size of each children block is 4 chroma samples. The current block 92 in FIG. 9A satisfies the predefined criterion because the chroma size of the children blocks is less than 16 chroma samples, so the current block 92 is set as a root block for sharing reference samples. In one embodiment, only using the root block neighboring samples for intra prediction is applied to chroma components only. One or more chroma blocks in the current block 92 use reference samples 94 of the current block for intra prediction as shown in FIG. 9A, and one or more luma blocks in the current block 92 use reference samples along each luma block's boundary. A size of a current block 96 in FIG. 9B is 32 chroma samples, and the current block 96 is split into three children blocks by vertical ternary tree partitioning. The chroma sizes of the children blocks are 8, 16, and 8 chroma samples. The current block 96 is set as a root block for sharing reference samples as the chroma size of at least one children block is less than 16 chroma samples. The chroma blocks in the current block 96 use reference samples 98 of the current block for intra prediction, and one or more luma blocks in the current block 92 use reference samples along each luma block's boundary.

In another embodiment, a width or height of one children block in the current block is checked with a predefined threshold to determine whether the current block satisfies the predefined criterion. For example, the current block satisfies the predefined criterion if the width of one children block in the current block is less than, equal to, or less than or equal to a predefined threshold. In some other examples, the current block satisfies the criterion if the height of one children block in the current block is less than, equal to, or less than or equal to a predefined threshold. All children blocks in the current block use reference samples along the current block boundary for intra prediction and the predefined criterion is not checked in other children blocks in the current block if the current block satisfies the predefined criterion. The predefined threshold for the width or height can be 4, 8, 16, 32, 64, and 128 luma samples or chroma samples depending on whether the current block is a luma block or a chroma block. In an example, the predefined threshold is 8 chroma samples and a current block satisfies the criterion if a width of one children block in the current block is less than 8 chroma samples, if splitting a 8×8 chroma block into two 4×8 children blocks, each of these two children blocks uses reference samples along the boundary of the 8×8 chroma block instead of reference samples along the boundary of the children block, and the same criterion is not checked in the other 4×8 children block in the 8×8 chroma block. In another example, a current block satisfies the criterion if a height of one children block in the current block is less than or equal to 8 chroma samples. In this example, if an 8×16 chroma block is further split into two 2×16 children blocks and one 4×16 child block, these three children blocks use reference samples along the boundary of the 8×16 chroma block and the criterion is not checked in the other children blocks.

In another embodiment, a size and a width or height of one children block in the current block is checked with a predefined threshold to determine whether the current block satisfies the predefined criterion. For example, the current block satisfies the predefined criterion if the size of one children block in the current block is less than, equal to, or less than or equal to a predefined threshold A, or the width of one children block in the current block is less than, equal to, or less than or equal to a predefined threshold B. In some other examples, the current block satisfies the criterion if the size of one children block in the current block is less than, equal to, or less than or equal to a predefined threshold A, or the height of one children block in the current block is less than, equal to, or less than or equal to a predefined threshold B. All children blocks in the current block use reference samples along the current block boundary for intra prediction and the predefined criterion is not checked in other children blocks in the current block if the current block satisfies the predefined criterion. The predefined threshold A for the size can be 4, 8, 16, 32, 64, 128, 256, 512, 1024, 2048, or 4096 luma samples or chroma samples depending on whether the current block is a luma block or a chroma block. The predefined threshold B for the width or height can be 4, 8, 16, 32, 64, and 128 luma samples or chroma samples depending on whether the current block is a luma block or a chroma block. In an example, the predefined threshold A is 16 chroma samples, and the predefined threshold B is 4 chroma samples and a current block satisfies the criterion if a size of one children block in the current block is less than or equal to 16 chroma samples, or a width of one children block in the current block is less than or equal to 4 chroma samples. In one example, if an 8×8 chroma block is split into two 4×8 children blocks, each of these two children blocks uses reference samples along the boundary of the 8×8 chroma block instead of reference samples along the boundary of the children block, and the same criterion is not checked in the other 4×8 children block in the 8×8 chroma block. In another example, if an 8×8 chroma block is split into two 2×8 children blocks and one 4×8 children block, each of these three children blocks uses reference samples along the boundary of the 8×8 chroma block instead of reference samples along the boundary of the children block, and the same criterion is not checked in all of the children block in the 8×8 chroma block.

In another embodiment, predefined criteria are related to both the width and height of a children block of a current block. For example, a current block is set as a root block if a width of one children block is less than a predefined threshold A and a height of the children block is less than another predefined threshold B, where the width of the children block in the current block is larger than or equal to its height. All children blocks in the current block share reference samples of the current block when the current block is set as a root block. A combination of threshold A for the width and threshold B for the height (thresA, thresB) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), and (128, 64). In another example, a current block is set as a root block if a height of one children block is less than a predefined threshold A and a width of the children block is less than another predefined threshold B, where the height of the children block in the current block is larger than or equal to its width. All children blocks in the current block share reference samples of the current block when the current block is set as a root block. A combination of threshold A for the height and threshold B for the width (thresA, thresB) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), and (128, 64).

In another embodiment, predefined criteria are related to a size, and both the width and height of a children block of a current block. For example, a current block is set as a root block if a size of one of the children block is less than a predefined threshold A, or a width of one children block is less than a predefined threshold B and a height of the children block is less than another predefined threshold C, where the height of the children block in the current block is larger than or equal to its width. All children blocks in the current block share reference samples of the current block when the current block is set as a root block. The predefined threshold A for the size can be 4, 8, 16, 32, 64, 128, 256, 512, 1024, 2048, or 4096 luma samples or chroma samples depending on whether the current block is a luma block or a chroma block. A combination of threshold B for the width and threshold C for the height (thresC, thresB) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), and (128, 64). In another example, a current block is set as a root block if a size of one of the children block is less than a predefined threshold A, or a height of one children block is less than a predefined threshold B and a width of the children block is less than another predefined threshold C, where the width of the children block in the current block is larger than or equal to its height. All children blocks in the current block share reference samples of the current block when the current block is set as a root block. The predefined threshold A for the size can be 4, 8, 16, 32, 64, 128, 256, 512, 1024, 2048, or 4096 luma samples or chroma samples depending on whether the current block is a luma block or a chroma block. A combination of threshold B for the width and threshold C for the height (thresB, thresC) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), and (128, 64).

In yet another embodiment, a current block satisfies a predefined criterion when a QT depth, MT depth, or both QT depth and MT depth of one children block split from the current block is larger than, equal to, or larger than or equal to a predefined threshold. All children blocks in the current block use reference samples along the current block boundary and the predefined criterion is not checked in the other children blocks if the current block satisfies the predefined criterion. For example, a current block is set as a root block during the partitioning process when a QT depth or MT depth of any children block in the current block is larger than, equal to, or larger than or equal to a predefined threshold. All children blocks use reference samples of the current block for intra prediction when the current block is set as a root block for sharing reference samples. The predefined threshold for the depth may be 1, 2, 3, 4, or 5. In another embodiment, a current block is set as a root block if an average depth calculated by both QT depth and MT depth of any children block is larger than, equal to, or larger than or equal to a predefined threshold, and all children blocks in the current block use reference samples of the current block when the current block is a root block. The threshold can be 1, 2, 3, 4, or 5. The average depth may be calculated by avg_depth=(A*QT depth+(2^B−A)*MT depth>>B). In one example, A is equal to 3 and B is equal to 3.

Another embodiment of a predefined criterion is related to an average QT depth or MT depth of neighboring blocks of one children block partitioned from a current block. The current block is set as a root block if the average QT depth or MT depth of the neighboring blocks of one children block is larger than, equal to, or larger than or equal to a predefined threshold. All children blocks in the current block use reference samples of the current block when the current block is set as a root block, and the predefined threshold for the average QT depth or MT depth of the neighboring blocks can be 1, 2, 3, 4, or 5.

In one embodiment, a current block is set as a root block during partitioning if one children block split from the current block satisfies one or more predefined criteria and the root block has not been set. A top-left position of the root block is set to be a top-left position of the current block, and a width and a height of the root block equal to a width and a height of the current block if the current block is set as the root block, otherwise, the root block is not set.

Setting Current Block as Root Block based on Multiple Criteria In various embodiments of the present invention, a current block is checked with one or more criteria and is set to be a root block for sharing reference samples if the one or more criteria are satisfied. Most of the previously described embodiments determine whether a current block is a root block according to only one criterion, in the following embodiments, multiple criteria are checked to judge whether a current block is a root block for sharing reference samples.

An exemplary embodiment of engaging multiple criteria checking sets a current block as a root block if the current block satisfies criterion A and one children block split from the current block satisfies criterion B. Neighboring reconstructed samples of one or more color components of the current block are used by all children blocks within the current block for intra prediction once the current block is set as a root block. The same multiple criteria checking will not be applied to the children blocks of the current block after setting the current block to be a root block. In one embodiment, a current block is a root block if a size of the current block satisfies criterion A and a size of one children block split from the current block satisfies criterion B. For example, a current block is set as a root block if a size of the current block is less than or equal to a predefined threshold and a size of at least one children block is less than or equal to another predefined threshold. In some alternative examples, a current block is set as a root block if a size of the current block is equal to a predefined threshold and a size of at least one children block is equal to another predefined threshold, or a current block is set as a root block if a size of the current block is less than a predefined threshold and a size of at least one children block is less than another predefined threshold. All children blocks will use reference samples of the current block for intra prediction if the current block is a root block. The predefined threshold for the size may be 4, 8, 16, 32, 64, 128, 256, 512, 1024, 2048, or 4096 luma samples or chroma samples.

In another embodiment, a current block is set as a root block if a width of the current block is larger than, equal to, or larger than or equal to a predefined threshold and a width of at least one children block is less than, or equal to, or less than or equal to another predefined threshold, where each of the predefined thresholds for the width may be 4, 8, 16, 32, 64, or 128 luma samples or chroma samples. All children blocks use reference samples of the current block for intra prediction when the current block is set as a root block. In another embodiment, a current block is set as a root block if a height of the current block is equal to a predefined threshold and a height of any children block is less than another predefined threshold. In yet another embodiment, a current block is set as a root block if width and height of the current block satisfies criteria A and B with width and height of one children block in the current block satisfies criteria C and D. Sizes of a current block and children blocks partitioned from the current block may be represented by depths, so in some embodiments, the current block is set as a root block during partitioning if a QT depth or MT depth of the current block is less than or equal to a predefined threshold and a QT depth or MT depth of at least one children block is larger than or equal to another predefined threshold. All children blocks in the current block use reference samples of the current block if the current block is set as a root block. In one embodiment, a current block is set as a root block if a first average depth calculated by both QT depth and MT depth of the current block is equal to a predefined threshold and a second average depth calculated by QT depth and MT depth of any children block is equal to another predefined threshold. An example of the average depth is calculated by avg_depth=(A*QT depth+(2^B−A)*MT depth>>B), where A and B are integers. In another embodiment, a current block is set as a root block if an average neighboring QT depth or MT depth of the current block is less than or equal to a predefined threshold and an average neighboring QT depth or MT depth of at least one children block is larger than or equal to another predefined threshold. All children blocks use reference samples of the current block if the current block is set as a root block. The predefined threshold for the depth may be 1, 2, 3, 4, or 5.

In another embodiment, a current block is set as a root block if a size of the current block is larger than, equal to, or larger than or equal to a predefined threshold A, or a width of the current block is larger than, equal to, or larger than or equal to a predefined threshold B and a size of the current block is less than, or equal to, or less than or equal to a predefined threshold A', or a width of at least one children block is less than, or equal to, or less than or equal to another predefined threshold B', where each of the predefined thresholds for the size may be 4, 8, 16, 32, 64, 128, 256, 512, 1024, 2048, or 4096 luma samples or chroma samples, and for the width may be 2, 4, 8, 16, 32, 64, or 128 luma samples or chroma samples. All children blocks use reference samples of the current block for intra prediction when the current block is set as a root block.

In another embodiment, a current block is set as a root block if a size of the current block is larger than, equal to, or larger than or equal to a predefined threshold A, or a width of the current block is larger than, equal to, or larger than or equal to a predefined threshold B and a height of the current block is larger than, equal to, or larger than or equal to a predefined threshold C and a size of the current block is less than, or equal to, or less than or equal to a predefined threshold A', or a width of at least one children block is less than, or equal to, or less than or equal to another predefined threshold B' and a width of at least one children block is less than, or equal to, or less than or equal to another predefined threshold C', where each of the predefined thresholds for the size may be 4, 8, 16, 32, 64, 128, 256, 512, 1024, 2048, or 4096 luma samples or chroma samples, and for the width or height may be 2, 4, 8, 16, 32, 64, or 128 luma samples or chroma samples. All children blocks use reference samples of the current block for intra prediction when the current block is set as a root block.

In some other embodiments, a current block is set as a root block if the current block satisfies criterion A and its parent block satisfies criterion B. Neighboring reconstructed samples of the current block are used for all children blocks within the current block and the criteria check will not be applied to all children blocks once the current block is set to be a root block. For example, a current block is set as a root block if a size of the current block is less than or equal to a first threshold and a size of its parent block is larger than a second threshold, where the first or second threshold may be 4, 8, 16, 32, 64, 128, 256, 512, 1024, 2048, or 4096 luma samples or chroma samples. In another embodiment, a current block is set to be a root block if a width of the current block is less than or equal to a predefined threshold and a width of a parent block of the current block is larger than another predefined threshold, where the predefined thresholds may be 4, 8, 16, 32, 64, or 128 luma samples or chroma samples. In an embodiment, when a width of a current block is larger than or equal to its height, a current block is set as a root block if a width of a parent block is larger than predefined threshold A and a height of the parent block is larger than another predefined threshold B, and a width of the current block is less than or equal to the predefined threshold A and a height of the current block is less than or equal to the predefined threshold B. The predefined threshold A can be 2, 4, 8, 16, 32, 64, or 128 luma samples or chroma samples, and the predefined threshold B can be 2, 4, 8, 16, 32, 64, or 128 luma samples or chroma samples. A combination of threshold A and threshold B, (thresA, thresB), can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), or (128, 64).

In another embodiment, a current block is set as a root block for sharing reference samples if a QT depth or MT depth of a parent block is less than or equal to a predefined threshold and a QT depth or MT depth of the current block is larger than or equal to the predefined threshold. One or more children blocks in the current block use reference samples of the current block if the current block is set as a root block. The predefined threshold for the depth may be 1, 2, 3, 4, or 5. In another embodiment, a current block is set as a root block if an average neighboring block QT depth or MT depth of a parent block is less than or equal to a predefined threshold and an average neighboring block QT depth or MT depth of the current block is larger than or equal to the predefined threshold. The predefined threshold for the average neighboring block QT depth or MT depth can be 1, 2, 3, 4, or 5.

In some embodiments of engaging multiple criteria checking, a current block is set as a root block if the current block satisfies two or more criteria. In an embodiment of applying multiple criteria checking, a current block is set as a root block if a size of the current block satisfies criterion A and partitioning of the current block satisfies criterion B. The size of the current block corresponds to a luma sample size or a chroma sample size. For example, beside checking the size of the current block with criterion A, a split flag for partitioning the current block or a splitting type applied to the current block is checked with criterion B, and the current block is set as a root block if both criteria are satisfied. One or more children blocks of the current block use neighboring reconstructed samples of one or more color components of the current block as reference samples for intra prediction if the current block is set to be a root block. Once the root block is set, the multiple criteria checking is not applied to the one or more children blocks in the current block. The split flag may indicate whether a particular splitting type is used to partition the current block, for example, a quadtree partitioning is applied to partition the current block if the split flag is true. Some examples of the splitting type are quadtree partitioning, horizontal binary tree partitioning, vertical binary tree partitioning, horizontal ternary tree partitioning, and vertical ternary tree partitioning. Each children block in the current block uses neighboring reconstructed samples of one or more color components of the block in the current block as reference samples for intra prediction if the current block is not a root block.

In some embodiments of engaging multiple criteria checking, a current block is set as a root block if the current block satisfies two or more criteria. In an embodiment of applying multiple criteria checking, a current block is set as a root block if a size of the current block satisfies criterion A and partitioning of the current block satisfies criterion B, or a width of the current block satisfies criterion C and partitioning of the current block satisfies criterion D. The size and width of the current block correspond to a luma sample size and a luma sample width or a chroma sample size and a chroma sample width. For example, beside checking the size of the current block with criterion A, a split flag for partitioning the current block or a splitting type applied to the current block is checked with criterion B, or beside checking the width of the current block with criterion C, a split flag for partitioning the current block or a splitting type applied to the current block is checked with criterion D, and the current block is set as a root block if both criteria A and criteria B, or both criteria C and criteria D are satisfied. One or more children blocks of the current block use neighboring reconstructed samples of one or more color components of the current block as reference samples for intra prediction if the current block is set to be a root block. Once the root block is set, the multiple criteria checking is not applied to the one or more children blocks in the current block. The split flag may indicate whether a particular splitting type is used to partition the current block, for example, a quadtree partitioning is applied to partition the current block if the split flag is true. Some examples of the splitting type are quadtree partitioning, horizontal binary tree partitioning, vertical binary tree partitioning, horizontal ternary tree partitioning, and vertical ternary tree partitioning. Each children block in the current block uses neighboring reconstructed samples of one or more color components of the block in the current block as reference samples for intra prediction if the current block is not a root block.

In some embodiments of engaging multiple criteria checking, a current block is set as a root block if the current block satisfies two or more criteria. In an embodiment of applying multiple criteria checking, a current block is set as a root block if a size of the current block satisfies criterion A and partitioning of the current block satisfies criterion B, or the combination of a width and a height of the current block satisfies criterion C and partitioning of the current block satisfies criterion D. For example, beside checking the size of the current block with criterion A, a split flag for partitioning the current block or a splitting type applied to the current block is checked with criterion B, or beside checking the combination of width and height of the current block with criterion C, a split flag for partitioning the current block or a splitting type applied to the current block is checked with criterion D, and the current block is set as a root block if both criteria A and criteria B or both criteria C and criteria D are satisfied. One or more children blocks of the current block use neighboring reconstructed samples of one or more color components of the current block as reference samples for intra prediction if the current block is set to be a root block. Once the root block is set, the multiple criteria checking is not applied to the one or more children blocks in the current block. The split flag may indicate whether a particular splitting type is used to partition the current block, for example, a quadtree partitioning is applied to partition the current block if the split flag is true. Some examples of the splitting type are quadtree partitioning, horizontal binary tree partitioning, vertical binary tree partitioning, horizontal ternary tree partitioning, and vertical ternary tree partitioning. Each children block in the current block uses neighboring reconstructed samples of one or more color components of the block in the current block as reference samples for intra prediction if the current block is not a root block.

In some embodiments, there is a syntax element for each block indicating a location of reference samples for intra prediction or other tool requiring neighboring reference samples or neighboring information. This syntax element is derived at both encoder and decoder sides so it is not signaled in the video bitstream according to one embodiment.

Children Blocks Use Reference Samples of Parent Block if Satisfying Predefined Criteria In some embodiments, all children blocks of a current block use reference samples of their parent block if the current block satisfies one or more predefined criteria during partitioning, otherwise, each of the children blocks use reference samples along the current block boundary. In this embodiment, the reference samples of the parent block may not be aligned with the reference samples of the current block. One embodiment of the predefined criterion is related to a size of the current block, for example, all children blocks use reference samples of their parent block if a size of a current block is less than, equal to, or less than or equal to a predefined threshold. Some examples of the predefined threshold for the size are 4, 8, 16, 32, 64, 128, 256, 1024, 2048, and 4096 luma samples or chroma samples. For example, a predefined threshold is 32 chroma samples and a current block with a size of 16 chroma samples is less than the predefined threshold, if this current block is further split into children blocks, these children blocks are encoded or decoded using the reference samples of the parent block. In one embodiment, the predefined criterion is related to a width or height of a current block. For example, if a width of a current block is less than a predefined threshold, one or more children blocks use reference samples of their parent block for intra prediction. The predefined threshold for the width or height can be 4, 8, 16, 32, 64, or 128 luma samples or chroma samples. In one example, if one 16 by 8 block is further split into eight 8 by 2 children blocks, these eight children blocks use reference samples of their parent block. In another example, if a height of a current block is less than a predefined threshold, one or more children blocks in the current block use reference samples of the current block for intra prediction and the same criterion is not checked in the one or more children blocks. The predefined threshold may be 4, 8, 16, 32, 64, or 128 luma samples or chroma samples. For example, if one 8 by 16 block is further split into eight 2 by 8 children blocks during partitioning, these eight children blocks use reference samples of their parent block.

In one embodiment, predefined criteria are related to both width and height of a current block. For example, a width of a current block is larger than or equal to its height, and the predefined criteria checks if the width is less than a predefined threshold A and the height is less than another predefined threshold B. One or more children blocks in the current block share reference samples of the parent block if the current block satisfies the predefined criteria. Some examples of the threshold A for the width are 2, 4, 8, 16, 32, 64, and 128 luma samples or chroma samples, and some examples of the threshold B for the height are 2, 4, 8, 16, 32, 64, and 128 luma samples or chroma samples. A combination of threshold A and threshold B (thresA, thresB) can be (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), or (128, 64). For example, one 64 by 8 block is split into two 32 by 8 children blocks during partitioning, and these two children blocks share same reference samples of the parent 64 by 8 block if the combination of threshold A and threshold B is (128, 16). In another example, a height of a current block is larger than or equal to its width, and the predefined criteria checks if the height is less than a predefined threshold A and the width is less than another predefined threshold B. One or more children blocks in the current block use reference samples of the current block if the current block satisfies the predefined criteria. The threshold A or B may be 2, 4, 8, 16, 32, 64, or 128 luma samples or chroma samples, and some examples of (thresA, thresB) are (8, 2), (16, 2), (32, 2), (64, 2), (128, 2), (8, 4), (16, 4), (32, 4), (64, 4), (128, 4), (16, 8), (32, 8), (64, 8), (128, 8), (32, 16), (64, 16), (128, 16), (64, 32), (128, 32), and (128, 64). For example, one 8 by 64 block is split into two 8 by 32 children blocks, and these two children blocks use same reference samples of the 8 by 64 block if (thresA, thresB) is (16, 128).

In another embodiment, a predefined criterion is related to a QT depth or MT depth of a current block. For example, one or more children blocks of a current block use reference samples of the current block for intra prediction when a QT depth, MT depth, or both QT depth and MT depth of the current block is larger than a predefined threshold. The predefined threshold for the depth may be 1, 2, 3, 4, or 5. For example, during partitioning, one block with a depth larger than 2 is further split into children blocks, and these children blocks use same reference samples of the parent block whose depth is 3. The predefined criterion is not checked in the children blocks. In another example, if a weighted depth calculated from both QT and MT depths of a current block is larger than a predefined threshold, then all children blocks of the current block use reference samples of their parent block. The weighted depth avg_depth can be calculated by avg_depth=(A*QT depth+(2^B−A)*MT depth>>B). In one example, A is equal to 3 and B is equal to 3.

In yet another embodiment, a predefined criterion is related to an average QT depth or average MT depth of neighboring blocks of a current block. For example, one or more children blocks in a current block use reference samples of the parent block if an average QT depth or MT depth of neighboring blocks of the current block is larger than a predefined threshold. The predefined threshold can be 1, 2, 3, 4, or 5.

Defining Root Block for Sharing Reference Samples by M×N Grid Some embodiments of the present invention define a root block for sharing neighboring reference samples by M×N grids, some examples of M or N are 2, 4, 8, 16, or 32 luma samples or chroma samples. M and N may be the same value, and in this case, each root block is a square block. Video data in a picture, a slice, or a tile are divided into M×N blocks, and if a current block is smaller than, or is smaller than or equal to, an M×N block, boundary neighboring reference samples of the M×N block are used to predict the current block. The current block may be a CU, PU, or TU. In some embodiments, a syntax element is derived for each block indicating a location of reference samples for the block, and this syntax element is not signaled to a decoder side as the decoder side is capable of deriving the syntax according to an embodiment.

In one embodiment, threshold A is defined for block widths and threshold B is defined for block heights. In a case when a width of a current block is smaller than, or smaller than or equal to, threshold A and a height of the current block is larger than or equal to, or larger than, threshold B, a block with a size equals to A*block_height and a top-left x position equals to (floor(pos_x/A))*A are used to generate boundary neighboring reference samples for the current block. In a case when a height of a current block is smaller than, or smaller than or equal to, threshold B and a width of the current block is larger than or equal to, or larger than, threshold A, a block with a size equals to block_width*B and a top-left y position equals to (floor(pos_y/B))*B are used to generate boundary neighboring reference samples for the current block. If a width of a current block is smaller than, or smaller than or equal to, threshold A and a height of the current block is smaller than, or smaller than or equal to, threshold B, a block with a size equals to A*B and a top-left x position equals to (floor(pos_x/A))*A and a y position equals to (floor(pos_y/B)*B are used to generate boundary neighboring reference samples for the current block. The function floor(x) is used to find a maximum integer value that closed to the input x.

In one embodiment, if a top-left position of a current block is within an M×N block A, a top-right position of the current block is within an M×N block B, and a bottom-left position of the current block is within an M×N block C, then reference block of the current block are boundary reconstructed samples of a block whose top-left position is (floor(topLeftPos_x/M)*M, floor(topLeftPos_y/N)*N), a reference block width is equal to M*(floor(topRightPos_x/M)−floor(topLeftPos_x/M)+1), and a reference block height is equal to N*(floor(bottomLeftPos_y/N)−floor(topLeftPos_y/N)+1).

FIGS. 10A and 10B illustrate an example of determining neighboring reference samples for each coding block with M×N root blocks. The block partition of the coding blocks is shown in FIG. 10A, and the coding order is block A, block B, block C, block D, then block E. The four M×N root blocks corresponding to the five coding blocks of FIG. 10A are shown in FIG. 10B.

Figure 11A:
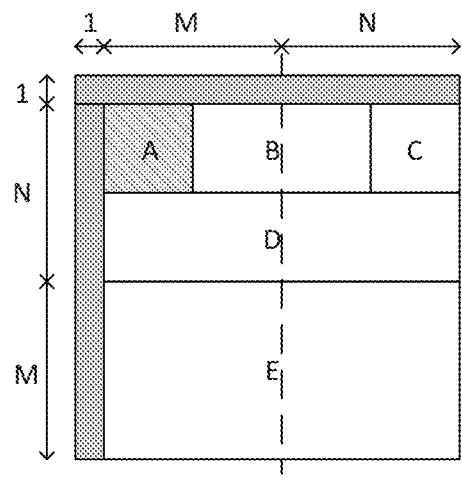
FIGS. 11A-11E illustrate neighboring reference samples for processing block A to block E respectively according to an embodiment of the present invention.
Figure 11B:
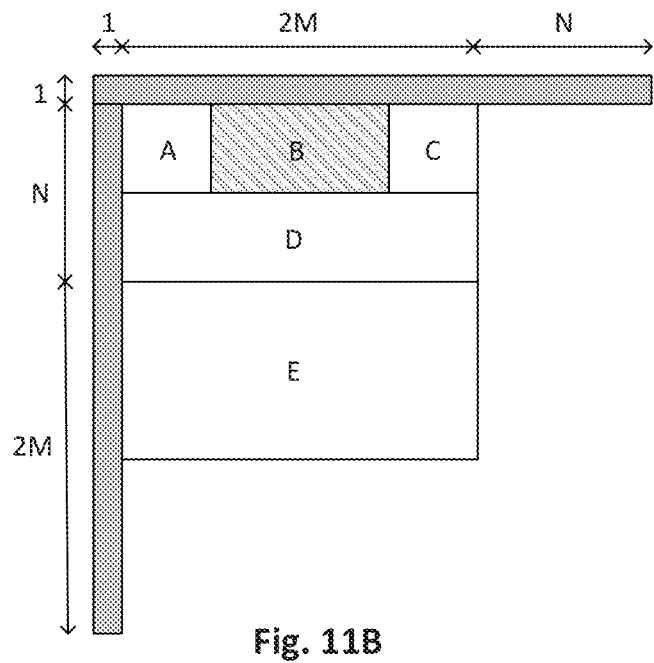
Figure 11C:
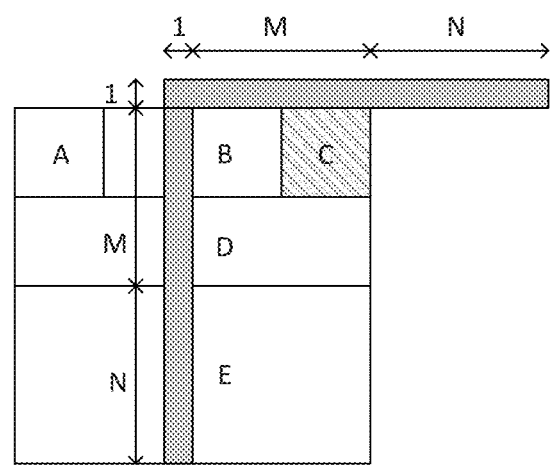
Figure 11D:
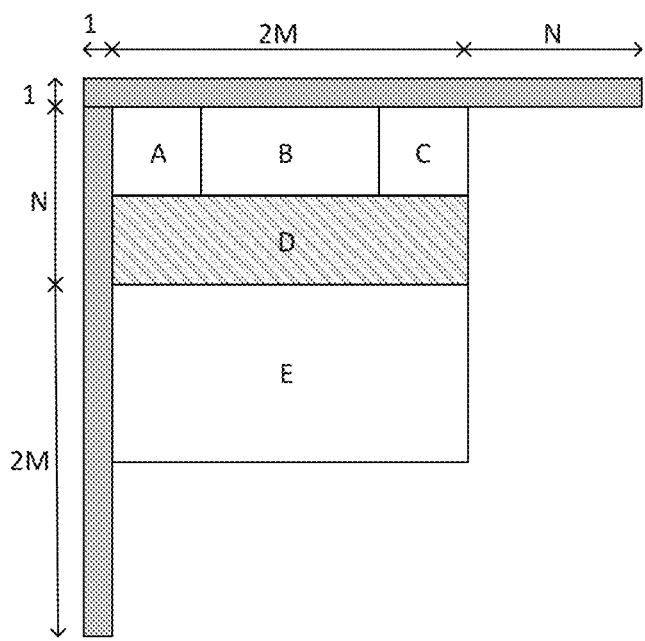
Figure 11E:
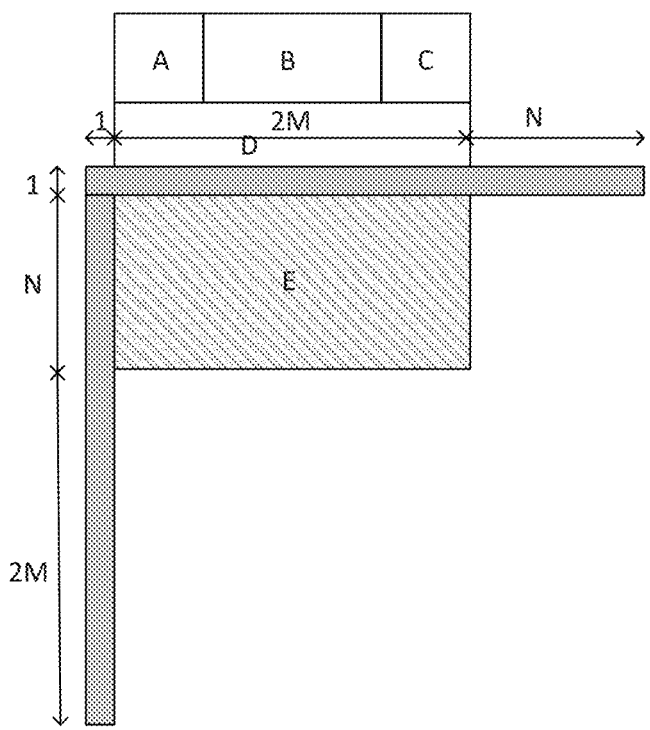

For block A, the entire block is within one M×N root block (root block 1), and a reference block top-left position is a top-left position of root block 1 in grid domain. A length of top boundary and left boundary reconstructed samples is equal to 1+N+M as shown in FIG. 11A. FIG. 11A to 11E illustrate neighboring reference samples for processing block A to block E respectively. For block B, both top-left and bottom-left positions of block B are in root block 1 in grid domain, and a top-right position of block B is in root block 2 in grid domain, a reference block position is in the top-left position of root block 1 but a reference block width is equal to 2M and a reference block height is equal to 1+2M+N, as shown in FIG. 11B. For block C, the entire block is within one M×N root block (root block 2), and a reference block top-left position is a top-left position of the root block 2 in grid domain. A length of both top boundary reconstructed samples and left boundary reconstructed samples is equal to 1+N+M as shown in FIG. 11C. For block D, both top-left and bottom-left positions of block D are in root block 1, and a top-right position of block D is in root block 2, a reference block position is in a top-left position of root block 1 but a reference block width is equal to 2M and a reference block height is equal to 1+2M+N as shown in FIG. 11D. For block E, both top-left and bottom left positions of block E are in root block 3 in grid domain, and a top-right position of block E is in root block 4 in grid domain, a reference block position is in a top-left position of root block 3, but a reference block width is equal to 2M and a reference block height is equal to N. A length of both top boundary reconstructed samples and left boundary reconstructed samples is equal to 1+2M+N as shown in FIG. 11E.

In another embodiment, if a reference block top-left x position is not a top-left x position of a CU, then a reference block x position becomes refBlock.position_x−1*M; if a reference block top-left y position is not a top-left y position of a CU, then a reference block y position becomes refBlock.position_y−1*N. This check will be applied iteratively until the reference block top-left position is a top-left position of one CU.

Figures 12A, 12B:
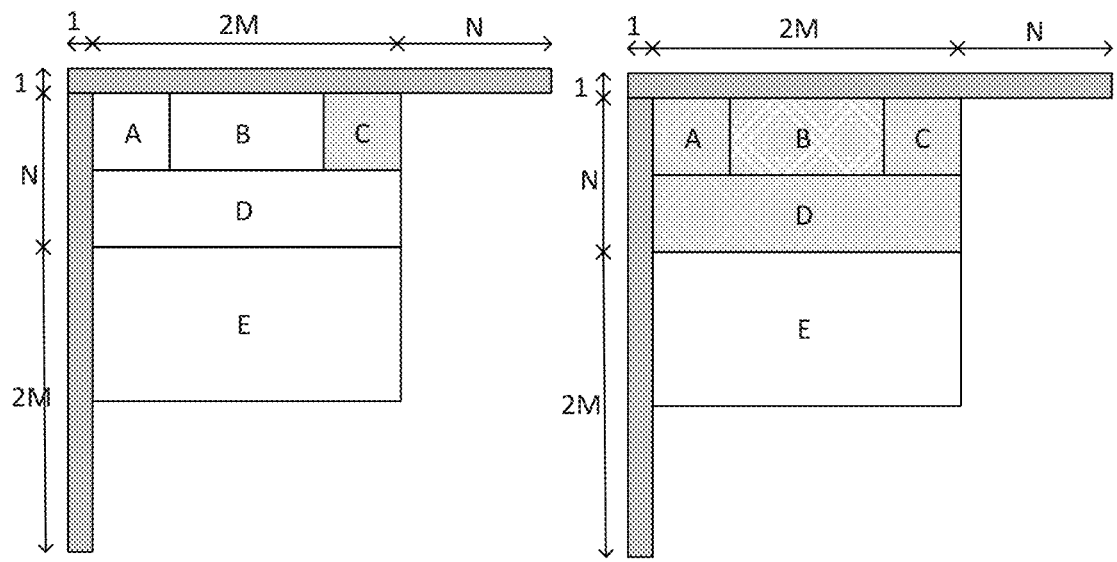
FIGS. 12A-12C illustrate neighboring reference samples for processing block C, blocks A to D, and block E respectively according to some embodiments of the present invention.
Figure 12C:
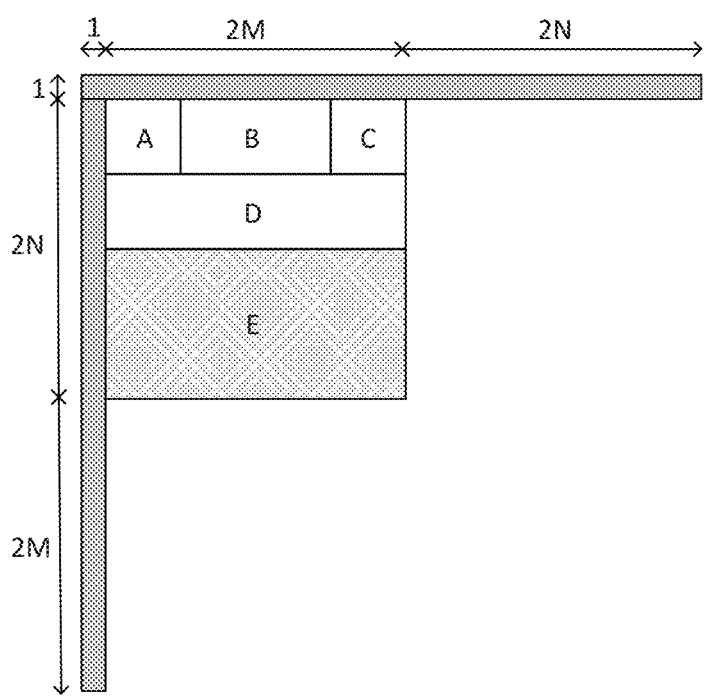

A reference block width is equal to M*(floor(topRightPos_x/M)−floor(topLeftPos_x/M)+1+(floor(topLeftPos_x/M)−reference block top-left x position/M)), and a reference block height is equal to N*(floor(bottomLeftPos_y/N)−floor(topLeftPos_y/N)+1+(floor(topLeftPos_y/N)−reference block top-left y position/N)). Therefore, in the example shown in FIGS. 10A and 10B, a reference block top-left position for block C is equal to a top-left position of root block 1. The length of both top boundary and left boundary reconstructed samples is equal to 1+N+2M as shown in FIG. 12A. FIG. 12A illustrates reference samples for block C according to this embodiment. In another embodiment, a reference block for each block is related to its parent block. A top-left position of the reference block is equal to (floor(parent.topLeftPos_x/M)*M, floor(parent.topLeftPos_y/N)*N), a reference block width is equal to M*(floor(parent.topRightPos_x/M)−floor(parent.topLeftPos_x/M)+1), and a reference block height is equal to N*(floor(parent.bottomLeftPos_y/N)−floor(parent.topLeftPos_y/N)+1). FIG. 12B illustrates same boundary reference samples for block A, block B, block C, and block D according to this embodiment. For block E, a top-left position of a reference block is equal to a top-left position of root block 1 in grid domain, and a length along top-boundary and left-boundary is equal to 1+2M+2N as shown in FIG. 12C. FIG. 12C illustrates reference samples for block E according to this embodiment.

Alternative Methods for Determining Reference Samples for Blocks Inside Root Block In some other embodiments, when neighboring reconstructed samples are required for encoding or decoding a block in a root block, and some of the neighboring reconstructed samples are within the root block of the current block, these boundary reference samples are treated as unavailable samples. A sample filing process is applied to generate those unavailable samples for encoding or decoding the block in the root block according to one embodiment. An original intra boundary sample generation process is applied and these unavailable samples are treated in the same way as those samples out of the picture or tile boundary according to another embodiment. In yet another embodiment, the unavailable samples inside the root block are generated or derived using reference samples outside the root block. For example, the unavailable samples are generated by copying one or more adjacent available reference samples outside the root block if one of the unavailable samples is adjacent to the one or more adjacent available reference samples. In another embodiment, one or more default value, such as 128 or 1<<(bitdepth-1), are assigned for those unavailable samples. For example, if any boundary reference sample of a current block is inside the corresponding root block, the boundary reference sample is set to a predefined value, such as 128, 512, or 1<<(bitdepth−1). In another example, if any boundary reference sample of a current block is inside the root block, the boundary reference sample is derived using boundary samples of the root block.

A current block is set to be a root block when the current block satisfies one or more criteria. Some examples of the criteria relate to one or a combination of a size, area, width, height, and depth of the current block, and a size, area, width, height, and depth of one children block split from the current block. Some examples of the depth are QT depth, BT depth, MT depth, combined depth, or average depth of neighboring blocks. For example, a current block is set as a root block when a size of the current block is less than, equal to, or less than or equal to a predefined threshold, where the predefined threshold can be 4, 8, 16, 32, 64, 128, 256, 512, 1024, 2048, or 4096 luma or chroma samples. In another example, a current block is set as a root block if a width of the current block is less than, equal to, or less than or equal to a predefined threshold, where the predefined threshold can be 2, 4, 8, 16, 32, 64, or 128 luma or chroma samples. In yet another example, a current block is set as a root block if both width and height of the current block are less than, equal to, or less than or equal to a predefined threshold, where the predefined threshold can be 2, 4, 8, 16, 32, 64, or 128 luma or chroma samples. An example of determining whether a current block is a root block by checking whether a width of the current block is less than, equal to, or less than or equal to predefined threshold A or a height of the current block is less than, equal to, or less than or equal to predefined threshold B. Each of threshold A for the width and threshold B for the height can be 2, 4, 8, 16, 32, 64, or 128 luma or chroma samples. A combination of threshold A and threshold B (thresA, thresB) can be any combination of threshold A and threshold B. Another example of determining whether a current block is a root block by checking whether a depth of the current block is larger than, equal to, or larger than or equal to a predefined threshold, where the threshold for the depth can be 1, 2, 3, 4, or 5. The depth may be a QT depth, MT depth, or both QT depth and MT depth of the current block, or a combined depth calculated by a linear combination of multiple depths. In another example, a weighted depth of a current block is checked with a predefined threshold, and the current block is a root block if the weighted depth is larger than, equal to, or larger than or equal to the predefined threshold. The weighted depth is calculated from QT depth and MT depth of the current block, for example, the weighted depth is calculated by avg_depth=(A*QT depth+(2^B−A)*MT depth>>B), or the weighted depth is equal to 2*QT depth+MT depth. In a case when one of the criteria is related to depth information of neighboring blocks of a current block, the current block is set as a root block if an average depth of the neighboring blocks is larger than, equal to, or larger than or equal to a predefined threshold, where the predefined threshold for the average depth can be 1, 2, 3, 4, or 5. Some examples of the average depth are average QT depth and average MT depth of the neighboring blocks.

Figure 13:
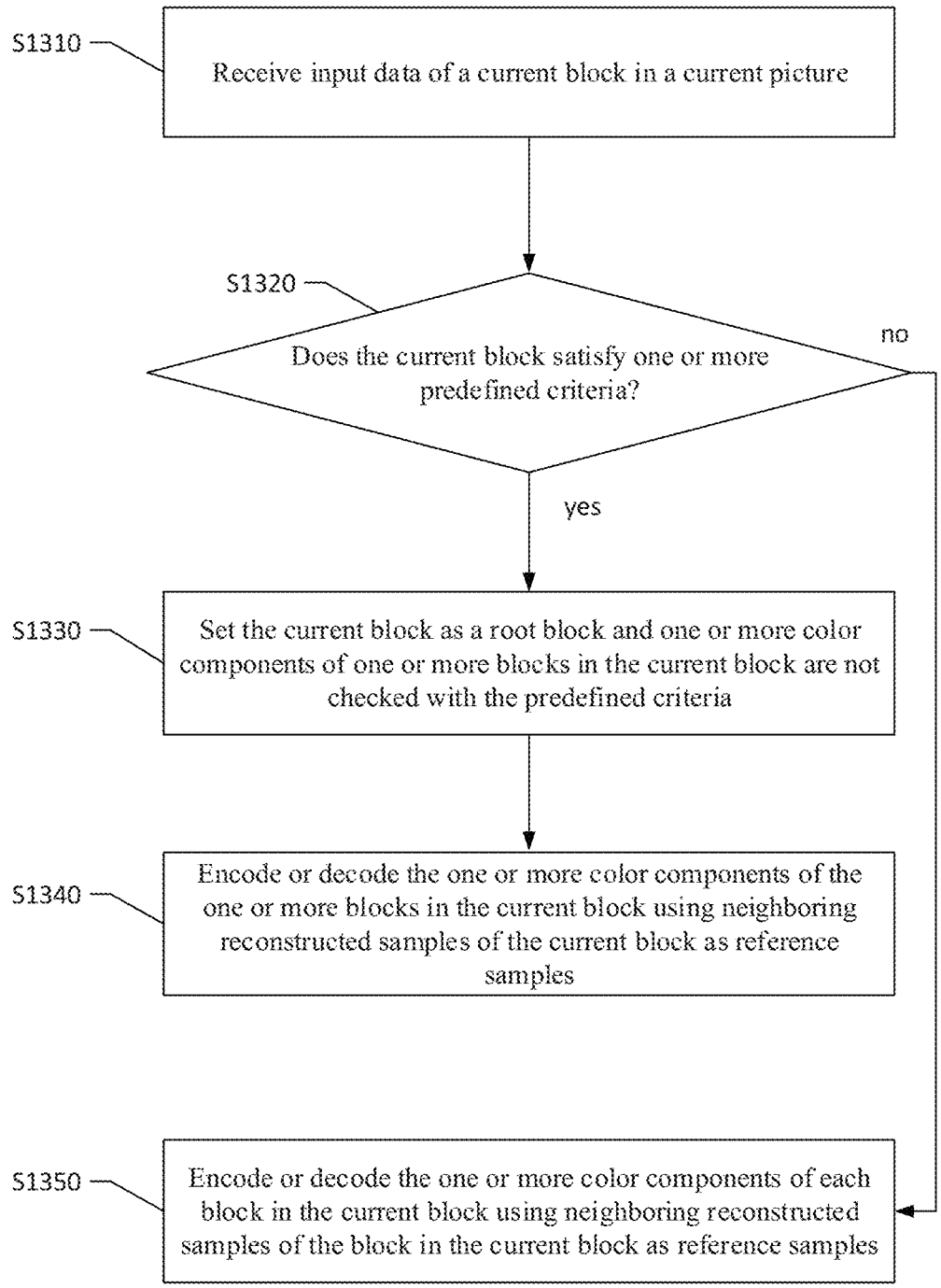
FIG. 13 is a flowchart illustrating an exemplary method according to an embodiment of the present invention.

Representative Flowchart FIG. 13 is a flowchart illustrating video processing method for processing a current block requiring neighboring reconstructed samples as reference samples according to embodiments of the present invention. An encoder or decoder receives input data of the current block in a current picture in step S1310. In step S1320, the encoder or decoder checks if the current block satisfies one or more predefined criteria during partitioning of the current block. For example, one or a combination of a size, width, height, width and height, depth, and splitting type of the current block, and a size, width, height, width and height, and depth of one children block split from the current block are checked with one or more predefined thresholds. If the current block satisfies the predefined criteria in step S1320, the current block is processed by steps S1330 and S1340. In step S1330, the current block is set as a root block and one or more color components of one or more blocks in the current block are not checked with the same predefined criteria. The video encoder or decoder then encodes or decodes the one or more color components of one or more blocks in the current block using neighboring reconstructed samples of the one or more color components of the current block as reference samples in step S1340. Reconstructed samples within the current block are not used to encode or decode the one or more color components of one or more blocks in the current block if the current block is set as a root block. For example, the video encoder or decoder generates an intra predictor for each block in the current block using an intra prediction mode and neighboring reconstructed samples of the one or more color components of the current block if the current block is set as a root block, and then the video encoder or decoder encodes or decodes the block according to the intra predictor. If the current block does not satisfy the predefined criteria in step S1320, each block in the current block is encoded or decoded using neighboring reconstructed samples of the one or more color components of the block in step S1350. For example, the video encoder or decoder uses neighboring reconstructed samples of one or more color components of each block in the current block to generate an intra predictor for each block in the current block when the current block is not a root block. The current block is a chroma block in one embodiment, or the current block can be a chroma block or a luma block according to another embodiment.

Figure 14:
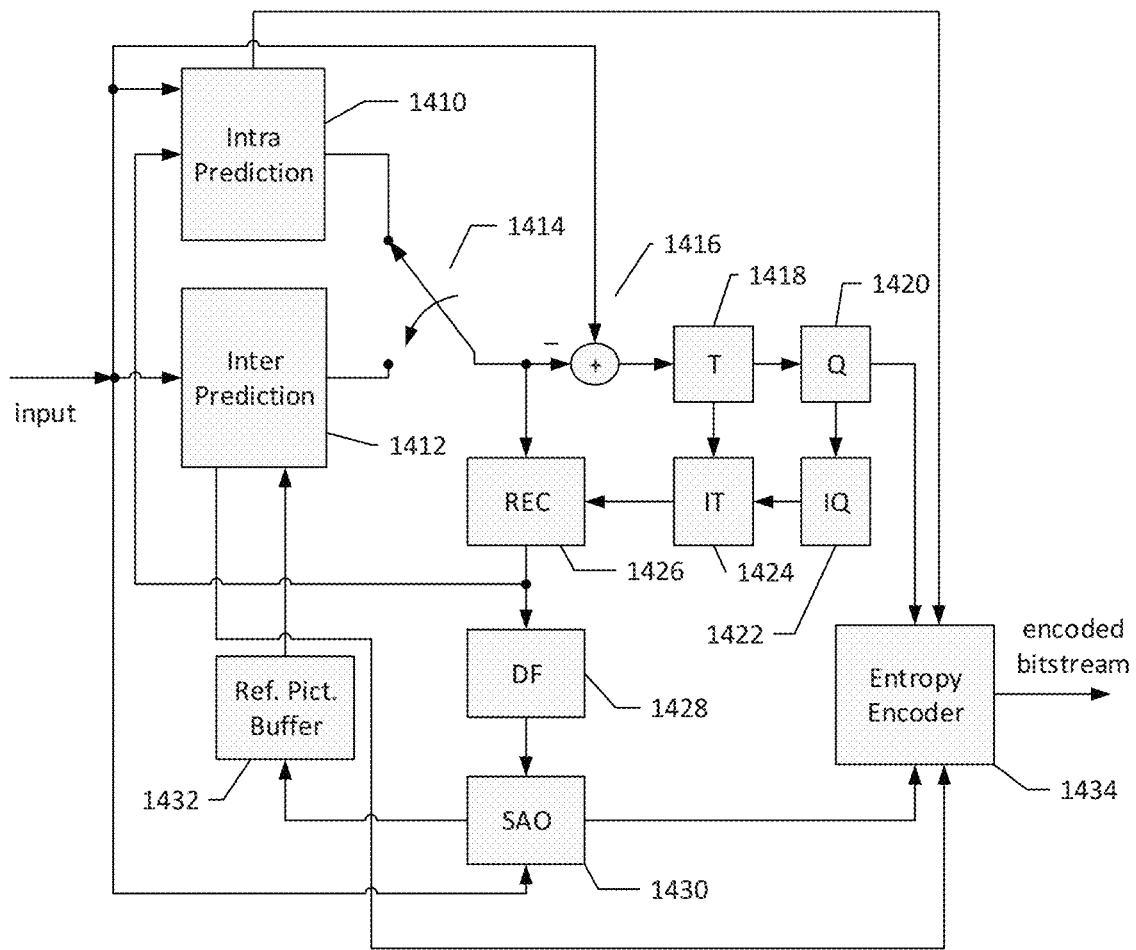
FIG. 14 illustrates an exemplary system block diagram for a video encoding system incorporating the video processing method according to embodiments of the present invention.

Representative Block Diagrams FIG. 14 illustrates an exemplary system block diagram for a Video Encoder 1400 implementing one or more of the video processing methods of the present invention. A current block is to be encoded according to neighboring reconstructed samples or neighboring information, for example, the current block is to be encoded in intra prediction or any other tool requires neighboring samples or neighboring information. Intra Prediction module 1410 provides an intra predictor for each block to be coded in intra prediction based reconstructed samples of a current picture according to an intra prediction mode. A current block is checked with one or more predefined criteria during partitioning and is set as a root block if the current block satisfies the predefined criteria. One or more color components of one or more blocks in the current block are not checked with the same predefined criteria if the current block is set as a root block. In some embodiments, neighboring reconstructed samples of the one or more color components of the current block are used by Intra Prediction module 1410 as reference samples for the one or more color components of one or more blocks in the current block to generate an intra predictor if the current block is set as a root block. In cases when the current block is not a root block and is further split into children blocks, Intra Prediction module 1410 uses neighboring reconstructed samples of the one or more color components of each children block as reference samples for generating an intra predictor for the children block. In one embodiment, Intra Prediction module 1410 derives MPMs from neighboring intra prediction modes of the current block for encoding the one or more color components of one or more blocks in the current block if the current block is set as a root block. In cases when the current block is not a root block, Intra Prediction module 1410 derives MPMs from neighboring intra prediction modes of each block in the current block for encoding the block in the current block. Inter Prediction module 1412 performs motion estimation (ME) and motion compensation (MC) to provide inter predictors based on video data from other picture or pictures. Either Intra Prediction module1410 or Inter Prediction module1412 supplies the selected predictor to Adder module1416 to form prediction errors, also called prediction residues. Since the current block is encoded by intra prediction, Intra Prediction module 1410 sends the intra predictor(s) for the current block to Adder module1416 to produce prediction residues of the current block.

The prediction residues of the current block are further processed by Transformation module (T) 1418 followed by Quantization module (Q) 1420. The transformed and quantized residual signal is then encoded by Entropy Encoder 1434 to form an encoded video bitstream. The encoded video bitstream is then packed with side information. The transformed and quantized residual signal of the current block is processed by Inverse Quantization module (IQ) 1422 and Inverse Transformation module (IT) 1424 to recover the prediction residues. As shown in FIG. 14, the prediction residues are recovered by adding back to the selected predictor at Reconstruction module (REC) 1426 to produce reconstructed samples. The reconstructed samples may be stored in Reference Picture Buffer (Ref. Pict. Buffer) 1432 and used for prediction of other pictures. The reconstructed samples from REC 1426 may be subject to various impairments due to the encoding processing, consequently, in-loop processing Deblocking Filter (DF) 1428 and Sample Adaptive Offset (SAO) 1430 are applied to the reconstructed samples before storing in the Reference Picture Buffer 1432 to further enhance picture quality. Syntax associated with information for the in-loop processing DF 1428 and SAO 1430 are provided to Entropy Encoder 1434 for incorporation into the encoded video bitstream.

Figure 15:
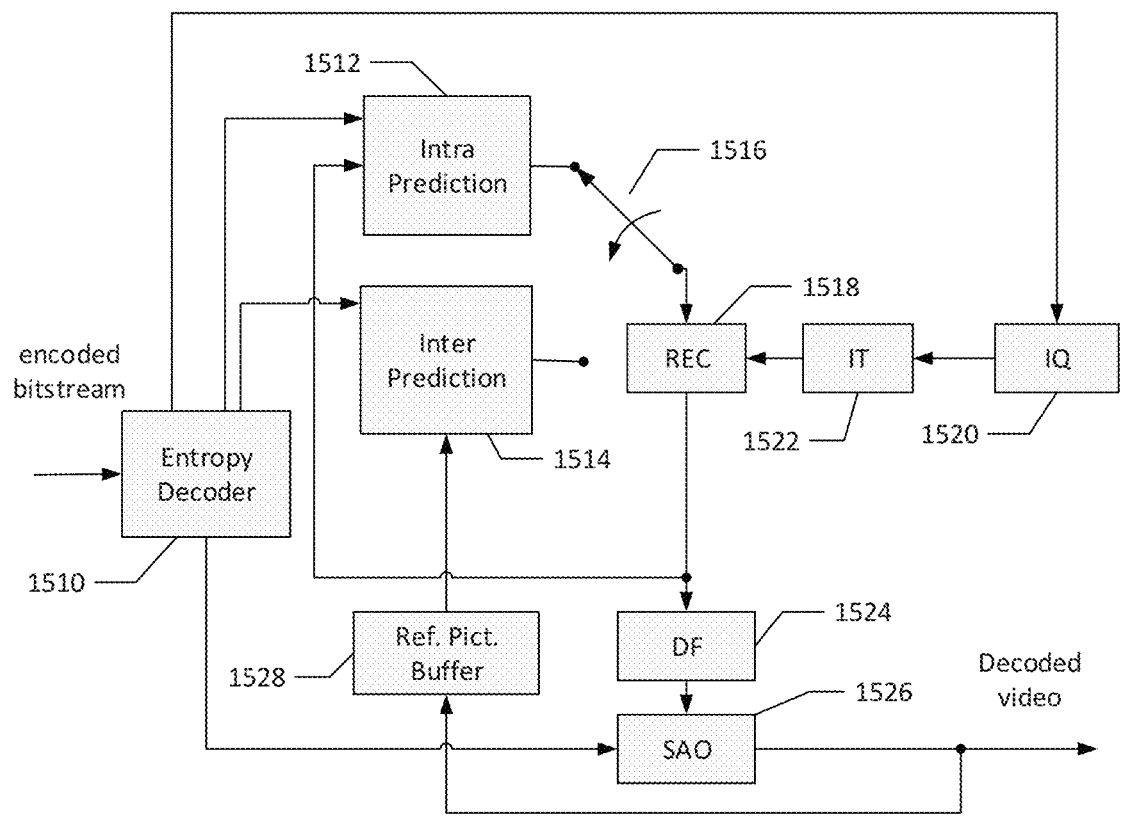
FIG. 15 illustrates an exemplary system block diagram for a video decoding system incorporating the video processing method according to embodiments of the present invention.

A corresponding Video Decoder 1500 for Video Encoder 1400 of FIG. 14 is shown in FIG. 15. The encoded video bitstream is the input to Video Decoder 1500 and is decoded by Entropy Decoder 1510 to parse and recover the transformed and quantized residual signal and other system information. The decoding process of Decoder 1500 is similar to the reconstruction loop at Encoder 1400, except Decoder 1500 only requires motion compensation prediction in Inter Prediction module 1514. Each block is decoded by either Intra Prediction module 1512 or Inter Prediction module 1514. Switch module 1516 selects an intra predictor from Intra Prediction module1512 or Inter predictor from Inter Prediction module 1514 according to decoded mode information. Intra Prediction module 1512 decodes an intra prediction mode for each block in the current block according to an embodiment of the present invention. The current block is checked with one or more predefined criteria during partitioning, and is set as a root block if the current block satisfies the predefined criteria. Intra Prediction module 1512 generates an intra predictor for each block in the current block using neighboring reconstructed samples of one or more color components of the current block and the intra prediction mode if the current block is set to be a root block. Intra Prediction module 1512 generates intra predictor for each block in the current block using neighboring reconstructed samples of the one or more color components of the block in the current block and the intra prediction mode if the current block is not a root block. In one embodiment, Intra Prediction module 1512 derives MPMs for each block in the current block based on neighboring intra prediction modes of the current block if the current block is set as a root block. The transformed and quantized residual signal associated with each block is recovered by Inverse Quantization module (IQ) 1520 and Inverse Transformation module (IT) 1522. The recovered transformed and quantized residual signal is reconstructed by adding back the predictor in REC module1518 to produce reconstructed samples. The reconstructed samples are further processed by DF 1524 and SAO 1526 to generate final decoded video. If the currently decoded picture is a reference picture, the reconstructed samples of the currently decoded picture are also stored in Ref. Pict. Buffer 1528 for later pictures in decoding order.

Various components of Video Encoder 1400 and Video Decoder 1500 in FIG. 14 and FIG. 15 may be implemented by hardware components, one or more processors configured to execute program instructions stored in a memory, or a combination of hardware and processor. For example, a processor executes program instructions to control receiving of input data associated with a current block in a current picture. The processor is equipped with a single or multiple processing cores. In some examples, the processor executes program instructions to perform functions in some components in Encoder 1400 and Decoder 1500, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 14 and 15, Encoder1400 and Decoder1500 may be implemented in the same electronic device, so various functional components of Encoder 1400 and Decoder 1500 may be shared or reused if implemented in the same electronic device. For example, one or more of Reconstruction module1426, Inverse Transformation module 1424, Inverse Quantization module 1422, Deblocking Filter 1428, Sample Adaptive Offset 1430, and Reference Picture Buffer 1432 in FIG. 14 may also be used to function as Reconstruction module1518, Inverse Transformation module 1522, Inverse Quantization module1520, Deblocking Filter 1524, Sample Adaptive Offset 1526, and Reference Picture Buffer 1528 in FIG. 15, respectively.

Embodiments of the processing method for a video coding system may be implemented in a circuit integrated into a video compression chip or program code integrated into video compression software to perform the processing described above. For examples, checking if the current block satisfies one or more predefined criteria may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video coding system, comprising:
    receiving input data associated with a current block in a current picture;
    checking if the current block satisfies two or more predefined criteria during partitioning; and
    if the current block satisfies the two or more predefined criteria during partitioning:
    encoding or decoding one or more chroma color components of the current block without further partitioning and using neighboring reconstructed samples of the one or more chroma color components of the current block as reference samples, and encoding or decoding the luma color component of each subblock in the current block using neighboring reconstructed samples of the luma color components of each subblock in the current block as reference samples,
    wherein the two or more predefined criteria correspond to block size, width, height or partitioning of the current block or one or more children block, wherein one of the two or more predefined criteria corresponds to the condition that the partitioning of the current block or one or more children block is quad-tree partition or ternary-tree partition.

2. The method of claim 1, wherein the two or more predefined criteria correspond to the condition that the block size of the current block is equal to 64 and the partitioning of the current block is quad-tree partition.

3. The method of claim 1, wherein the two or more predefined criteria correspond to the condition that the block size of the current block is equal to 128 and the partitioning of the current block is ternary-tree partition.

4. The method of claim 1, wherein the two or more predefined criteria correspond to the condition that the block size of the current block is equal to 64 and the partitioning of the current block is ternary-tree partition.

5. The method of claim 1, wherein the two or more predefined criteria correspond to the condition that the block size of the current block is equal to a threshold and the partitioning of the current block is ternary-tree partition.

6. The method of claim 1, wherein the two or more predefined criteria correspond to the condition that the width of the current block is equal to a threshold and the partitioning of the current block is ternary-tree partition.

7. An apparatus of processing video data in a video coding system, the apparatus comprising one or more electronic circuits configured for:

receiving input data associated with a current block in a current picture;

checking if the current block satisfies two or more predefined criteria during partitioning; and if the current block satisfies the two or more predefined criteria during partitioning:

encoding or decoding one or more chroma color components of the current block without further partitioning and using neighboring reconstructed samples of the one or more chroma color components of the current block as reference samples, and encoding or decoding the luma color component of each subblock in the current block using neighboring reconstructed samples of the luma color components of each subblock in the current block as reference samples, wherein the two or more predefined criteria correspond to block size, width, height or partitioning of the current block or one or more children block, wherein one of the two or more predefined criteria corresponds to the condition that the partitioning of the current block or one or more children block is quad-tree partition or ternary-tree partition.

* * * * *